US010421337B2

(12) United States Patent
Miyakoshi et al.

(10) Patent No.: US 10,421,337 B2
(45) Date of Patent: Sep. 24, 2019

(54) VEHICLE AIR CONDITIONER

(71) Applicant: Sanden Holdings Corporation, Isesaki-shi, Gunma (JP)

(72) Inventors: Ryo Miyakoshi, Isesaki (JP); Kenichi Suzuki, Isesaki (JP); Hidenori Takei, Isesaki (JP); Kouhei Yamashita, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 639 days.

(21) Appl. No.: 14/441,139

(22) PCT Filed: Nov. 11, 2013

(86) PCT No.: PCT/JP2013/080474
§ 371 (c)(1),
(2) Date: May 6, 2015

(87) PCT Pub. No.: WO2014/073689
PCT Pub. Date: May 15, 2014

(65) Prior Publication Data
US 2015/0298525 A1    Oct. 22, 2015

(30) Foreign Application Priority Data

Nov. 9, 2012    (JP) .................................. 2012-247513

(51) Int. Cl.
*B60H 1/00*    (2006.01)
*B60H 1/32*    (2006.01)
(Continued)

(52) U.S. Cl.
CPC ..... *B60H 1/00899* (2013.01); *B60H 1/00921* (2013.01); *B60H 1/00978* (2013.01);
(Continued)

(58) Field of Classification Search
CPC ............ B60H 1/00899; B60H 1/00914; B60H 1/00921; B60H 2001/00957; F25B 5/04;
(Continued)

(56) References Cited

U.S. PATENT DOCUMENTS 4,483,156 A * 11/1984 Oudenhoven ........... F25B 39/00
                                                                62/324.1
5,575,155 A * 11/1996 Mita ......................... F25B 9/10
                                                                62/6
(Continued)

FOREIGN PATENT DOCUMENTS

CN    101213410 B    5/2010
CN    101839580 A    9/2010
(Continued)

OTHER PUBLICATIONS

The State Intellectual Property Office of People's Republic of China; The First Office Action issued in Patent Application No. CN 201380058543.2, dated Jun. 23, 2016.
(Continued)

*Primary Examiner* — Frantz F Jules
*Assistant Examiner* — Nelson J Nieves
(74) *Attorney, Agent, or Firm* — Baker Botts LLP

(57)    ABSTRACT

There is disclosed a vehicle air conditioner which can effectively eliminate occurrence of excess or lack of an amount of a refrigerant to be circulated in an internal cycle mode. A controller changes and executes a heating mode, a dehumidifying and heating mode, an internal cycle mode, a dehumidifying and cooling mode, and a cooling mode. When an amount of the refrigerant to be circulated is excessively large in the internal cycle mode, a controller executes a refrigerant sealing mode to seal a refrigerant in an outdoor heat exchanger 7, and when the amount of the refrigerant to be circulated is insufficient, the controller
(Continued)

US 10,421,337 B2

Page 2 executes a refrigerant discharge mode to discharge the refrigerant from the outdoor heat exchanger 7.

10 Claims, 20 Drawing Sheets

(51) Int. Cl.
| | |
|---|---|
| F25B 49/02 | (2006.01) |
| F25B 49/00 | (2006.01) |
| F25B 40/00 | (2006.01) |
| F25B 5/04 | (2006.01) |
| F25B 6/04 | (2006.01) |
| F25B 40/02 | (2006.01) |
| F25B 47/02 | (2006.01) |

(52) U.S. Cl.
CPC ......... *B60H 1/3213* (2013.01); *B60H 1/3225* (2013.01); *F25B 5/04* (2013.01); *F25B 6/04* (2013.01); *F25B 40/00* (2013.01); *F25B 49/005* (2013.01); *F25B 49/02* (2013.01); *B60H 2001/00957* (2013.01); *F25B 40/02* (2013.01); *F25B 47/022* (2013.01); *F25B 2400/0403* (2013.01); *F25B 2400/0409* (2013.01); *F25B 2500/19* (2013.01); *F25B 2600/01* (2013.01); *F25B 2600/0253* (2013.01); *F25B 2600/2501* (2013.01); *F25B 2600/2513* (2013.01); *F25B 2600/2519* (2013.01); *F25B 2700/02* (2013.01); *F25B 2700/195* (2013.01); *F25B 2700/2116* (2013.01)

(58) Field of Classification Search
CPC .. F25B 6/04; F25B 40/00; F25B 49/02; F25B 49/005; F25B 40/02; F25B 2600/2501; F25B 47/022; F25B 2600/0253; F25B 2400/0403; F25B 2500/19; F25B 2600/2513; F25B 2600/2519
See application file for complete search history.

(56) References Cited

U.S. PATENT DOCUMENTS

| | | | | | |
|---|---|---|---|---|---|
| 5,598,887 | A | * | 2/1997 | Ikeda | B60H 1/00392 |
| | | | | | 165/202 |
| 5,634,348 | A | * | 6/1997 | Ikeda | B60H 1/00735 |
| | | | | | 62/160 |
| 7,121,103 | B2 | * | 10/2006 | Itoh | B60H 1/00735 |
| | | | | | 62/173 |
| 7,788,937 | B2 | | 9/2010 | Kawakatsu et al. | |
| 9,517,680 | B2 | | 12/2016 | Suzuki et al. | |
| 9,732,663 | B2 | * | 8/2017 | Kawakami | F01P 9/06 |
| 2004/0060316 | A1 | * | 4/2004 | Ito | B60H 1/00328 |
| | | | | | 62/324.1 |
| 2005/0028547 | A1 | * | 2/2005 | Hatakeyama | B60H 1/00921 |
| | | | | | 62/324.1 |
| 2007/0204635 | A1 | * | 9/2007 | Tanaka | F25B 13/00 |
| | | | | | 62/129 |
| 2009/0114309 | A1 | | 5/2009 | Sakai et al. | |
| 2009/0151378 | A1 | | 6/2009 | Kawakatsu et al. | |
| 2010/0089085 | A1 | * | 4/2010 | Kawano | F25B 13/00 |
| | | | | | 62/238.6 |
| 2010/0293975 | A1 | * | 11/2010 | Kawano | F25B 13/00 |
| | | | | | 62/149 |
| 2010/0326127 | A1 | * | 12/2010 | Oomura | B60H 1/00785 |
| | | | | | 62/498 |
| 2012/0240604 | A1 | * | 9/2012 | Choi | B60H 1/00921 |
| | | | | | 62/79 |
| 2012/0318012 | A1 | * | 12/2012 | Choi | B60H 1/00921 |
| | | | | | 62/129 |
| 2012/0318013 | A1 | | 12/2012 | Hozumi et al. | |
| 2013/0019615 | A1 | * | 1/2013 | Choi | B60H 1/00 |
| | | | | | 62/79 |
| 2013/0118200 | A1 | * | 5/2013 | Aoun | B60H 1/00921 |
| | | | | | 62/324.5 |
| 2013/0186131 | A1 | * | 7/2013 | Guitar | B60H 1/00342 |
| | | | | | 62/498 |
| 2013/0199217 | A1 | * | 8/2013 | Arai | B60H 1/00278 |
| | | | | | 62/79 |
| 2013/0227984 | A1 | * | 9/2013 | Tsunoda | B60H 3/024 |
| | | | | | 62/324.1 |
| 2013/0291577 | A1 | | 11/2013 | Miyakoshi et al. | |

FOREIGN PATENT DOCUMENTS

| | | |
|---|---|---|
| DE | 11 2012 000 522 T5 | 10/2013 |
| DE | 11 2012 001 074 T5 | 12/2013 |
| JP | H05-272817 A | 10/1993 |
| JP | H09-295506 A | 11/1997 |
| JP | 2009-115324 A | 5/2009 |
| JP | 2011-178372 A | 9/2011 |
| JP | 2012-007856 A | 1/2012 |
| JP | 2012-176659 A | 9/2012 |
| WO | 2012/063289 A1 | 5/2012 |
| WO | 2012/098966 A1 | 7/2012 |
| WO | 2012/118198 A1 | 9/2012 |

OTHER PUBLICATIONS

German Patent and Trade Mark Office; Office Action issued in Application No. DE 11 2013 005 347.0, dated Jan. 25, 2017.
The State Intellectual Property Office of the People's Republic of China, The Second Office Action issued in Application No. CN 201380058543.2, dated Jan. 18, 2017.
Japan Patent Office; Notification of Reasons for Refusal issued in Japanese Patent Application No. 2012-247513, dated Aug. 17, 2016.
State Intellectual Property Office of the People's Republic of China, Official Reexamination Notice issued in Chinese Application No. 201380058543.2, dated Oct. 29, 2018.

\* cited by examiner

HEATING MODE

DEHUMIDIFYING AND HEATING MODE

INTERNAL CYCLE MODE

DEHUMIDIFYING AND COOLING MODE

COOLING MODE

REFRIGERANT SEALING MODE

REFRIGERANT DISCHARGE MODE

VEHICLE AIR CONDITIONER

CROSS-REFERENCE TO RELATED APPLICATIONS

This application is a U.S. National Stage Patent Application under 37 U.S.C. § 371 of International Patent Application No. PCT/JP2013/080474, filed on Nov. 11, 2013, which claims the benefit of Japanese Patent Application No. JP 2012-247513, filed on Nov. 9, 2012, the disclosures of which are incorporated herein by reference in their entirety.

TECHNICAL FIELD

The present invention relates to an air conditioner of a heat pump system which conditions air in a vehicle interior, and more particularly, it relates to an air conditioner applicable to a hybrid car or an electric car.

BACKGROUND ART

Due to actualization of environmental problems in recent years, hybrid cars and electric cars have spread. Furthermore, as an air conditioner which is applicable to such a vehicle, there has been developed an air conditioner which comprises a compressor to compress and discharge a refrigerant, a radiator disposed on a vehicle interior side to let the refrigerant absorb heat, a heat absorber disposed on the vehicle interior side to let the refrigerant absorb heat, and an outdoor heat exchanger disposed on a vehicle exterior side to let the refrigerant radiate or absorb heat, and which executes respective operation modes of a heating cycle in which the refrigerant discharged from the compressor radiates heat in the radiator and the refrigerant by which heat has been radiated in this radiator absorbs heat in the outdoor heat exchanger, a dehumidifying and heating cycle in which the refrigerant discharged from the compressor radiates heat in the radiator and the refrigerant by which heat has been radiated in the radiator absorbs heat only in the heat absorber or in this heat absorber and the outdoor heat exchanger, a cooling cycle in which the refrigerant discharged from the compressor radiates heat in the outdoor heat exchanger and absorbs heat in the heat absorber, and a dehumidifying and cooling cycle in which the refrigerant discharged from the compressor radiates heat in the radiator and the outdoor heat exchanger and absorbs heat in the heat absorber (e.g., see Patent Document 1).

Additionally, in the above publication, when the heating cycle and the cooling cycle are changed, the cycle is changed via an internal cycle. This internal cycle has a state where the refrigerant is inhibited from flowing into the outdoor heat exchanger and the refrigerant radiates heat in the radiator and absorbs heat in the heat absorber, and hence as compared with the dehumidifying and heating cycle or the dehumidifying and cooling cycle, a dehumidifying capability further heightens and a heating capability becomes smaller. Therefore, these other types of operation modes (cycles) are changed in accordance with conditions such as an environment and a set temperature, thereby performing comfortable air condition in a vehicle interior.

CITATION LIST

Patent Documents

Patent Document 1: Japanese Patent Application Publication No. H09-295506

SUMMARY OF THE INVENTION

Problems to be Solved by the Invention

Here, in such an operation mode of an internal cycle (hereinafter referred to as an internal cycle mode), control is basically executed to inhibit inflow of a refrigerant into an outdoor heat exchanger and outflow of the refrigerant from the outdoor heat exchanger. Therefore, an amount of the refrigerant to be sealed in the outdoor heat exchanger varies in accordance with a state of the refrigerant flowing in the outdoor heat exchanger immediately before the mode is changed from an operation mode of a dehumidifying and heating cycle (hereinafter referred to as a dehumidifying and heating mode) to the internal cycle mode or from an operation mode of a dehumidifying and cooling cycle (hereinafter referred to as a dehumidifying and cooling mode) to the internal cycle mode, so that excess or lack occurs in an amount of the refrigerant to be circulated in a refrigerant circuit in the internal cycle mode.

When the lack of the refrigerant (excessively little refrigerant) occurs in the internal cycle mode, a temperature of the radiator rises, but a heating capability itself is insufficient. On the other hand, when the excess of the refrigerant occurs, a high pressure abnormally rises. In consequence, there has been the problem that a hunting phenomenon occurs in which after the change to the internal cycle mode, a desirable air conditioning performance in a vehicle interior cannot be exerted and the mode disadvantageously immediately changes to another operation mode.

The present invention has been developed to solve such a conventional technical problem, and an object thereof is to provide a vehicle air conditioner which can effectively eliminate occurrence of excess or lack of an amount of a refrigerant to be circulated in an internal cycle mode.

Means for Solving the Problems

A vehicle air conditioner of the invention of claim 1 comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, an expansion valve which decompresses the refrigerant flowing into this outdoor heat exchanger, and control means, this control means being configured to change and execute one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat in the heat absorber and the outdoor heat exchanger, an internal cycle mode in which inflow of the refrigerant into the outdoor heat exchanger and outflow of the refrigerant from the outdoor heat exchanger are inhibited, the refrigerant discharged from the compressor radiates heat in the radiator, and the refrigerant by which heat has been radiated is decompressed and then absorbs heat in the heat absorber, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that in the internal cycle mode, the control means executes a refrigerant sealing mode to seal the refrigerant in the outdoor heat exchanger in a case where an amount of the refrigerant to be circulated is excessively large, and executes a refrigerant discharge mode to discharge the refrigerant from the outdoor heat exchanger in a case where the amount of the refrigerant to be circulated is insufficient.

The vehicle air conditioner of the invention of claim 2 is characterized in that in the above invention, the control means judges whether or not the amount of the refrigerant to be circulated is excessively large on the basis of a refrigerant subcool degree of the radiator, and judges whether or not the amount of the refrigerant to be circulated is insufficient on the basis of a discharged refrigerant superheat degree of the compressor.

A vehicle air conditioner of the invention of claim 3 comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, an expansion valve which decompresses the refrigerant flowing into this outdoor heat exchanger, and control means, this control means being configured to change and execute one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat in the heat absorber and the outdoor heat exchanger, an internal cycle mode in which inflow of the refrigerant into the outdoor heat exchanger and outflow of the refrigerant from the outdoor heat exchanger are inhibited, the refrigerant discharged from the compressor radiates heat in the radiator, and the refrigerant by which heat has been radiated is decompressed and then absorbs heat in the heat absorber, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that in the internal cycle mode, the control means closes the expansion valve which decompresses the refrigerant flowing into the outdoor heat exchanger, to inhibit the inflow into the outdoor heat exchanger, and discharges the refrigerant from the outdoor heat exchanger every predetermined timing.

The vehicle air conditioner of the invention of claim 4 is characterized in that in the above invention, the control means regulates the timing to discharge the refrigerant from the outdoor heat exchanger and/or a discharge amount on the basis of a refrigerant flow rate.

A vehicle air conditioner of the invention of claim 5 comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, an expansion valve which decompresses the refrigerant flowing into this outdoor heat exchanger, and control means, this control means being configured to change and execute one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat in the heat absorber and the outdoor heat exchanger, an internal cycle mode in which inflow of the refrigerant into the outdoor heat exchanger and outflow of the refrigerant from the outdoor heat exchanger are inhibited, the refrigerant discharged from the compressor radiates heat in the radiator, and the refrigerant by which heat has been radiated is decompressed and then absorbs heat in the heat absorber, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that when the control means shifts to the internal cycle mode, the control means delays a timing to inhibit the outflow of the refrigerant from the outdoor heat exchanger.

A vehicle air conditioner of the invention of claim 6 comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, an expansion valve which decompresses the refrigerant flowing into this outdoor heat exchanger, and control means, this control means being configured to change and execute one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat in the heat absorber and the outdoor heat exchanger, an internal cycle mode in which inflow of the refrigerant into the outdoor heat exchanger and outflow of the refrigerant from the outdoor heat exchanger are inhibited, the refrigerant discharged from the compressor radiates heat in the radiator, and the refrigerant by which heat has been radiated is decompressed and then absorbs heat in the heat absorber, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that when the control means shifts to the internal cycle mode, the control means delays a timing to inhibit the inflow of the refrigerant into the outdoor heat exchanger.

Advantageous Effect of the Invention

According to a vehicle air conditioner of the invention of claim 1, in an internal cycle mode in which inflow of a refrigerant into an outdoor heat exchanger and outflow of the refrigerant from the outdoor heat exchanger are inhibited, the refrigerant discharged from a compressor radiates heat in a radiator, and the refrigerant by which heat has been radiated is decompressed and then absorbs heat in a heat absorber, when an amount of the refrigerant to be circulated is excessively large, a refrigerant sealing mode to seal the refrigerant in the outdoor heat exchanger is executed, and when the amount of the refrigerant to be circulated is insufficient, a refrigerant discharge mode to discharge the refrigerant from the outdoor heat exchanger is executed. Therefore, also when in accordance with a state immediately before the mode is changed to the internal cycle mode, an amount of the refrigerant to be sealed in the outdoor heat exchanger varies and excess or lack occurs in the amount of the refrigerant to be circulated, it is possible to suitably regulate the amount of the refrigerant to be circulated, thereby acquiring a necessary air conditioning performance, or it is possible to avoid occurrence of a high pressure abnormality due to the excessive refrigerant.

In consequence, the air conditioning performance required in the internal cycle mode can be acquired, and occurrence of a so-called hunting phenomenon can be avoided.

In particular, when as in the invention of claim 2, control means judges whether or not the amount of the refrigerant to be circulated is excessively large on the basis of a refrigerant subcool degree of the radiator, and judges whether or not the amount of the refrigerant to be circulated is insufficient on the basis of a discharged refrigerant superheat degree of the compressor, it is possible to accurately judge the excess or lack of the amount of the refrigerant to be circulated and to precisely regulate the amount of the refrigerant to be circulated in the internal cycle mode.

According to a vehicle air conditioner of the invention of claim 3, in an internal cycle mode in which inflow of a refrigerant into an outdoor heat exchanger and outflow of the refrigerant from the outdoor heat exchanger are inhibited and the refrigerant discharged from a compressor radiates heat in a radiator and the refrigerant by which heat has been radiated is decompressed and then absorbs heat in a heat absorber, control means discharges the refrigerant from the outdoor heat exchanger every predetermined timing. Therefore, when an expansion valve which decompresses the refrigerant flowing into the outdoor heat exchanger is closed to inhibit the inflow of the refrigerant into the outdoor heat exchanger, lack of an amount of the refrigerant to be circulated due to the inflow of the refrigerant into the outdoor heat exchanger is caused by leakage of the expansion valve, but can be eliminated by discharging the refrigerant every predetermined time, so that it is possible to acquire the required air conditioning performance.

In this case, when as in the invention of claim 4, the control means regulates a timing to discharge the refrigerant from the outdoor heat exchanger and/or a discharge amount on the basis of a refrigerant flow rate, it is possible to more accurately control the amount of the refrigerant to be discharged from the outdoor heat exchanger and to precisely regulate the amount of the refrigerant to be circulated.

According to a vehicle air conditioner of the invention of claim 5, during shift to an internal cycle mode in which inflow of a refrigerant into an outdoor heat exchanger and outflow of the refrigerant from the outdoor heat exchanger are inhibited and the refrigerant discharged from a compressor radiates heat in a radiator and the refrigerant by which heat has been radiated is decompressed and then absorbs heat in a heat absorber, control means delays a timing to inhibit the outflow of the refrigerant from the outdoor heat exchanger. Therefore, it is possible to beforehand avoid lack of an amount of the refrigerant to be circulated which occurs after shifting to the internal cycle mode and to acquire a required air conditioning performance.

According to a vehicle air conditioner of the invention of claim 6, during shift to an internal cycle mode in which inflow of a refrigerant into an outdoor heat exchanger and outflow of the refrigerant from the outdoor heat exchanger are inhibited and the refrigerant discharged from a compressor radiates heat in a radiator and the refrigerant by which heat has been radiated is decompressed and then absorbs heat in a heat absorber, control means delays a timing to inhibit the inflow of the refrigerant into the outdoor heat exchanger. Therefore, it is possible to beforehand avoid excess of an amount of the refrigerant to be circulated which occurs after shifting to the internal cycle mode and to eliminate occurrence of a high pressure abnormality.

MODE FOR CARRYING OUT THE INVENTION

Hereinafter, an embodiment of the present invention will be described in detail with reference to the drawings.

Figure 1:
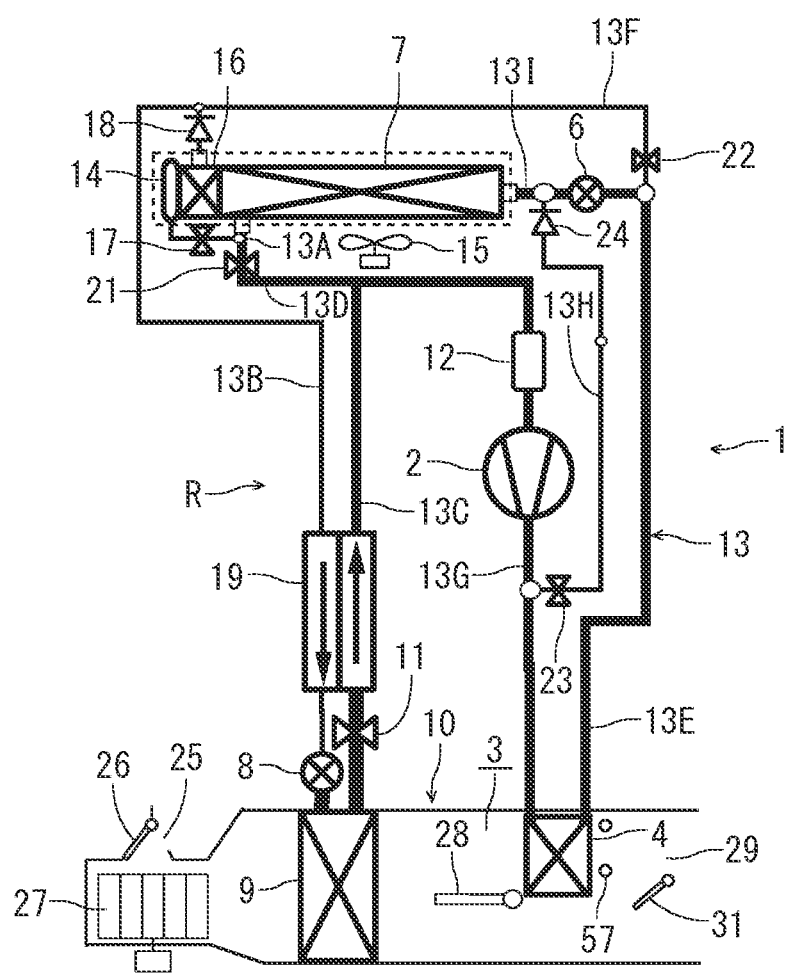
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is driven by the power of the battery.

That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like. It is to be noted that the vehicle is not limited to the electric car, and the present invention is also effective for a so-called hybrid car in which the engine is used together with the electric motor for the running, and is further applicable also to a usual car which runs by the engine.

The vehicle air conditioner 1 of the embodiment performs air conditioning (heating, cooling, dehumidifying, and ventilation) in the electric car, and there are successively connected, by a refrigerant pipe 13, an electric compressor 2 which compresses a refrigerant to raise a pressure, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying and heating, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed to perform the heat exchange between the outdoor air and the refrigerant when the vehicle is stopped.

In addition, the outdoor heat exchanger 7 has a header portion 14 and a subcooling portion 16 successively on a refrigerant downstream side, a refrigerant pipe 13A extended out from the outdoor heat exchanger 7 is connected to the header portion 14 via a solenoid valve (an opening/closing valve) 17 opened during the cooling, and an outlet of the subcooling portion 16 is connected to the indoor expansion valve 8 via a check valve 18. It is to be noted that the header portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a refrigerant pipe 13G on a discharge side of the compressor 2 is branched, and this branched refrigerant pipe 13H communicates to be connected to a refrigerant pipe 13I between the outdoor expansion valve 6 and the outdoor heat exchanger 7 via a solenoid valve (an opening/closing valve) 23 which is opened during defrosting of the outdoor heat exchanger 7 to allow the high-temperature refrigerant (a hot gas) discharged from the compressor 2 to flow directly into the outdoor heat exchanger 7 and a check valve 24. It is to be noted that a direction of the refrigerant pipe 13I of the check valve 24 is the forward direction.

Additionally, in the air flow passage 3 on an air upstream side of the heat absorber 9, respective suction ports (represented by a suction port 25 in FIG. 1), e.g., an indoor air suction port and an outdoor air suction port are formed, and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
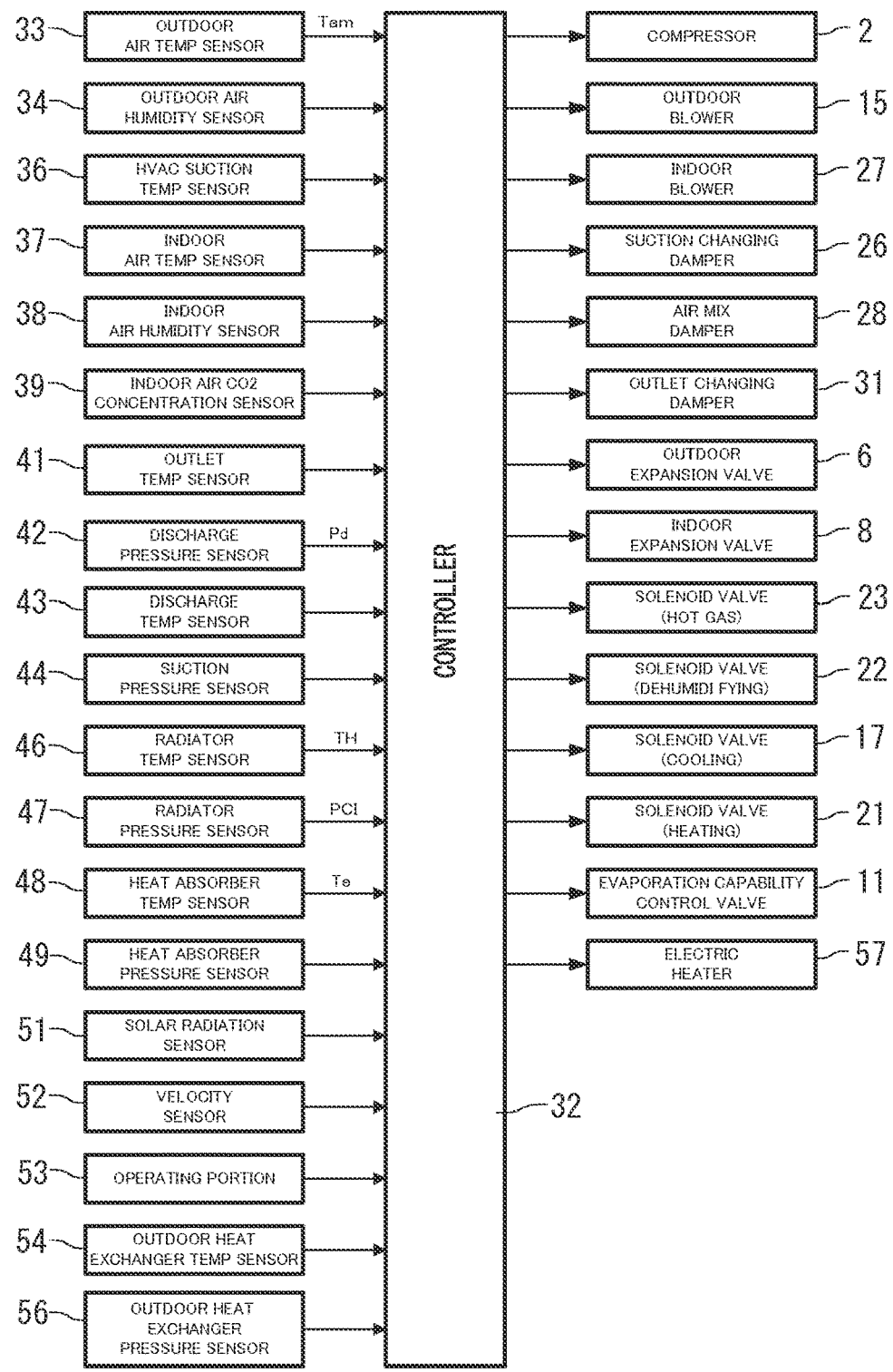
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a suction temperature from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the radiator 4 itself or the temperature of the air heated in the radiator 4), a radiator pressure sensor 47 which detects a refrigerant pressure of the radiator 4 (the pressure in the radiator 4 or the pressure of the refrigerant flowing out from the radiator 4), a heat absorber temperature sensor 48 which detects a temperature of the heat absorber 9 (the temperature of the heat absorber 9 itself or the air cooled in the heat absorber 9), a heat absorber pressure sensor 49 which detects a refrigerant pressure of the heat absorber 9 (the pressure in the heat absorber 9 or the pressure of the refrigerant flowing out from the heat absorber 9), a solar radiation sensor 51 of, e.g., a photo sensor system to detect a solar radiation amount into the vehicle, a velocity sensor 52 to detect a moving speed of the vehicle (a velocity), an operating portion 53 to set the changing of the temperature or the operation mode, an outdoor heat exchanger temperature sensor 54 which detects a temperature of the outdoor heat exchanger 7, and an outdoor heat exchanger pressure sensor 56 which detects the refrigerant pressure of the outdoor heat exchanger 7.

An output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 23, 22, 17 and 21, and the evaporation capability control valve 11. In addition, the output of the controller 32 is also connected to an electric heater 57 disposed in the air flow passage 3 on the air downstream side of the radiator 4 to complement the heating by the radiator 4, and the controller 32 controls these components on the basis of the outputs of the respective sensors and the setting input by the operating portion 53.

Next, an operation of the vehicle air conditioner 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Heating Mode

Figure 14:
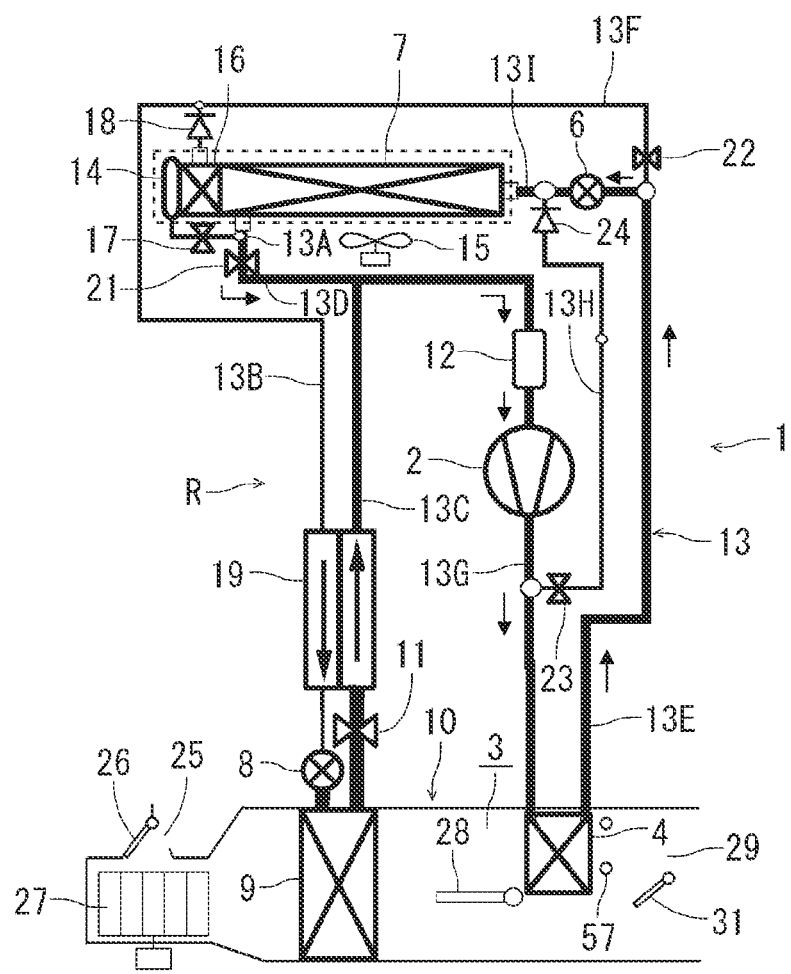
FIG. 14 is a constitutional view of a vehicle air conditioner of one embodiment to which the present invention is applied.

Referring to FIGS. 1 and 14, when the heating mode is selected by the controller 32 or a manual operation to the operating portion 53, the controller 32 opens the solenoid valve 21 and closes the solenoid valve 17, the solenoid valve 22 and the solenoid valve 23. Furthermore, the compressor 2 and the respective blowers 15 and 27 are operated, and the air mix damper 28 has a state where the air blown out from the indoor blower 27 is passed through the radiator 4. In consequence, the high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows through the refrigerant pipe 13E to reach the outdoor expansion valve 6 which decompresses the refrigerant, and then the refrigerant flows into the outdoor heat exchanger 7. The refrigerant flowing into the outdoor heat exchanger 7 evaporates, and the heat is pumped up from the outdoor air passed by running or the outdoor blower 15 (a heat pump). Furthermore, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

The controller 32 controls a revolution number of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Dehumidifying and Heating Mode

Figure 15:
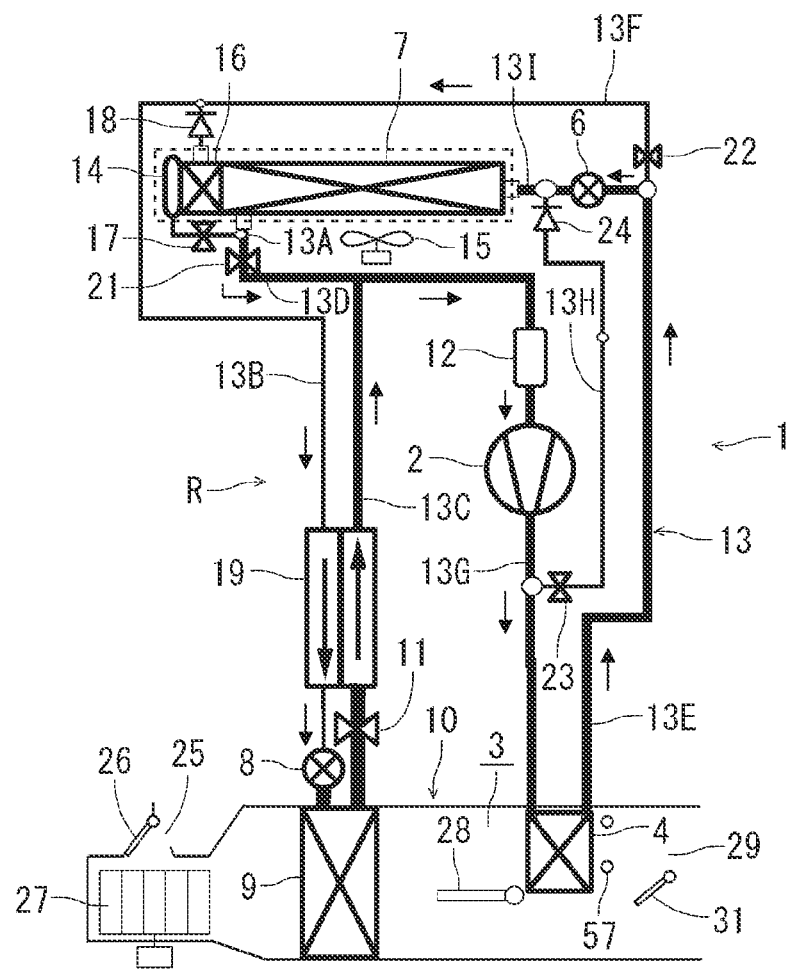
FIG. 15 is a constitutional view of a vehicle air conditioner of one embodiment to which the present invention is applied.

Referring to FIGS. 1 and 15, next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the revolution number of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Figure 16:
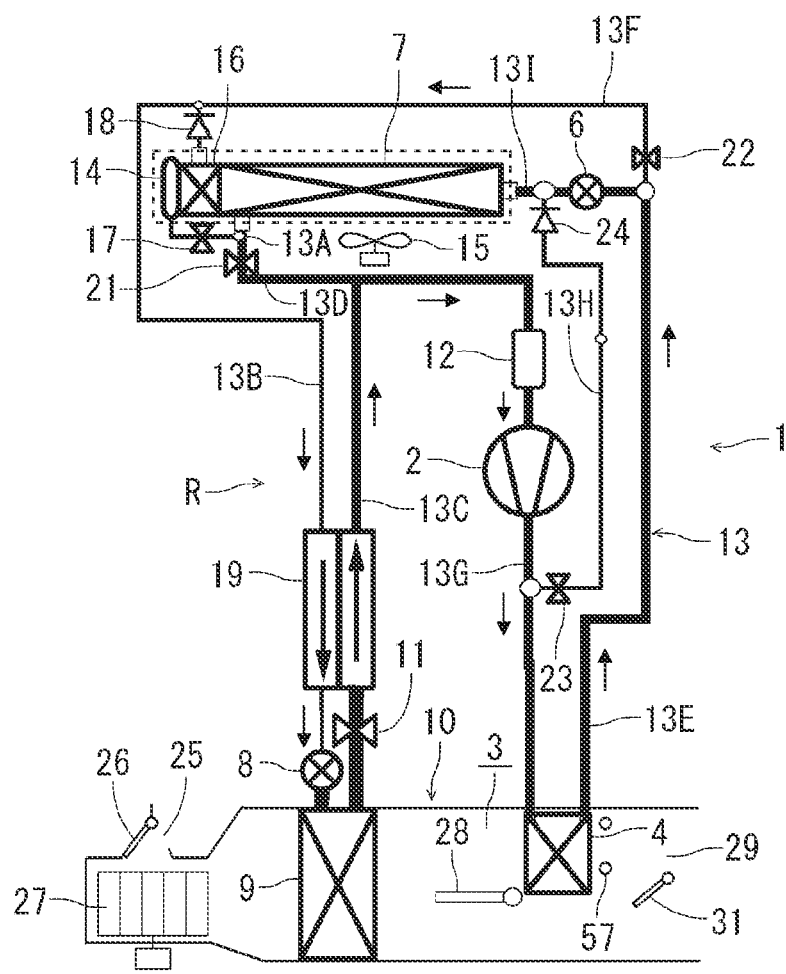
FIG. 16 is a constitutional view of a vehicle air conditioner of one embodiment to which the present invention is applied.

Referring to FIGS. 1 and 16, next, in the internal cycle mode, the controller 32 shuts off the outdoor expansion valve 6 in the above state of the dehumidifying and heating mode (a shut off position) and also closes the solenoid valve 21. When the outdoor expansion valve 6 and the solenoid valve 21 are closed, inflow of the refrigerant into the outdoor heat exchanger 7 and outflow of the refrigerant from the outdoor heat exchanger 7 are inhibited, and hence all the condensed refrigerant flowing through the radiator 4 and the refrigerant pipe 13E flows through the solenoid valve 22 to the refrigerant pipe 13F. Furthermore, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the revolution number of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2 as described later.

(4) Dehumidifying and Cooling Mode

Figure 17:
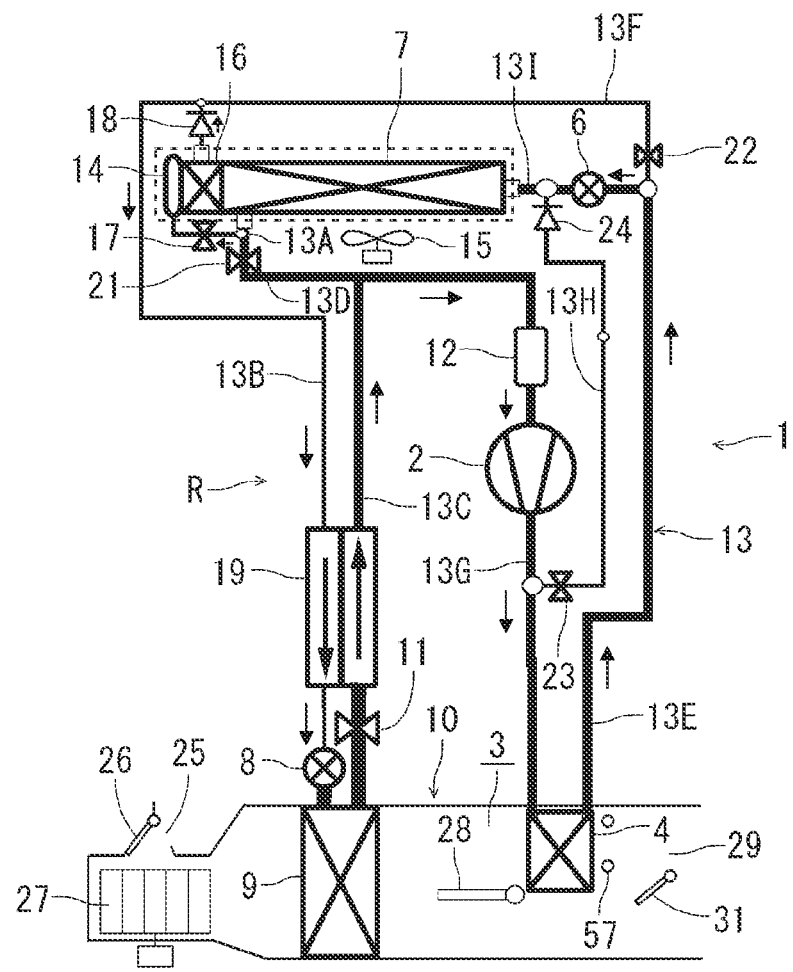
FIG. 17 is a constitutional view of a vehicle air conditioner of one embodiment to which the present invention is applied.

Referring to FIGS. 1 and 17, next, in the dehumidifying and cooling mode, the controller 32 opens the solenoid valve 17 and closes the solenoid valve 21, the solenoid valve 22 and the solenoid valve 23. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the revolution number of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (an after-mentioned radiator pressure PCI) of the radiator 4.

(5) Cooling Mode

Figure 18:
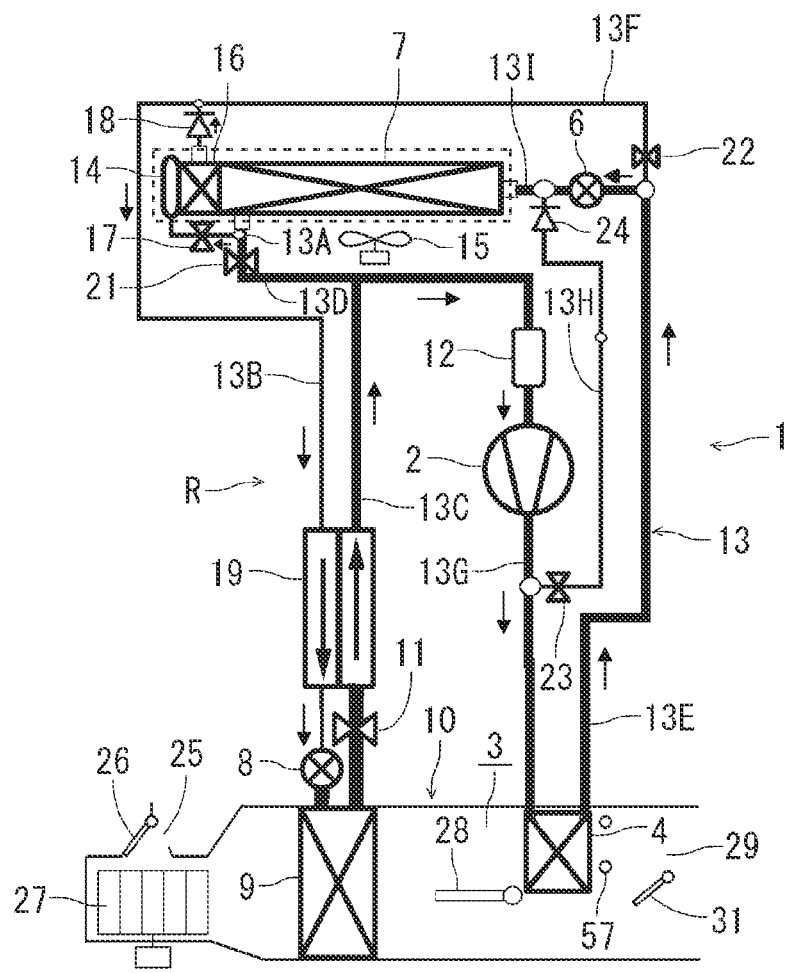
FIG. 18 is a constitutional view of a vehicle air conditioner of one embodiment to which the present invention is applied.

Referring to FIGS. 1 and 18, next, in the cooling mode, the controller 32 fully opens the outdoor expansion valve 6 in the above state of the dehumidifying and cooling mode (sets the valve position to an upper limit of controlling), and the air mix damper 28 has a state where the air is not passed through the radiator 4. In consequence, the high-temperature high-pressure gas refrigerant discharged from the compressor 2 flows into the radiator 4. The air in the air flow passage 3 is not passed through the radiator 4, the air therefore only passes here, and the refrigerant flowing out from the radiator 4 flows through the refrigerant pipe 13E to reach the outdoor expansion valve 6.

At this time, the outdoor expansion valve 6 is fully opened and hence the refrigerant flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed.

Figure 3:
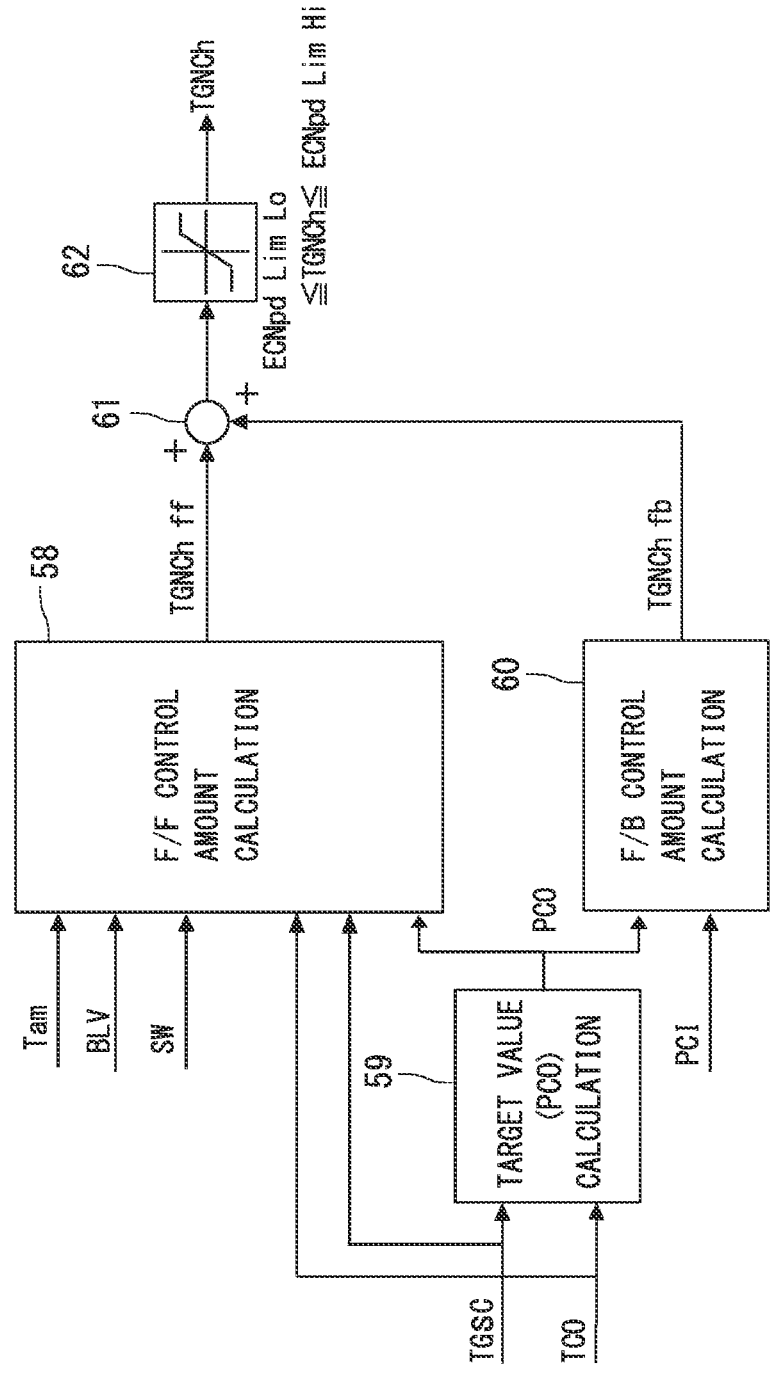
FIG. 3 is a control block diagram concerning compressor control of the controller of FIG. 2.
Figure 4:
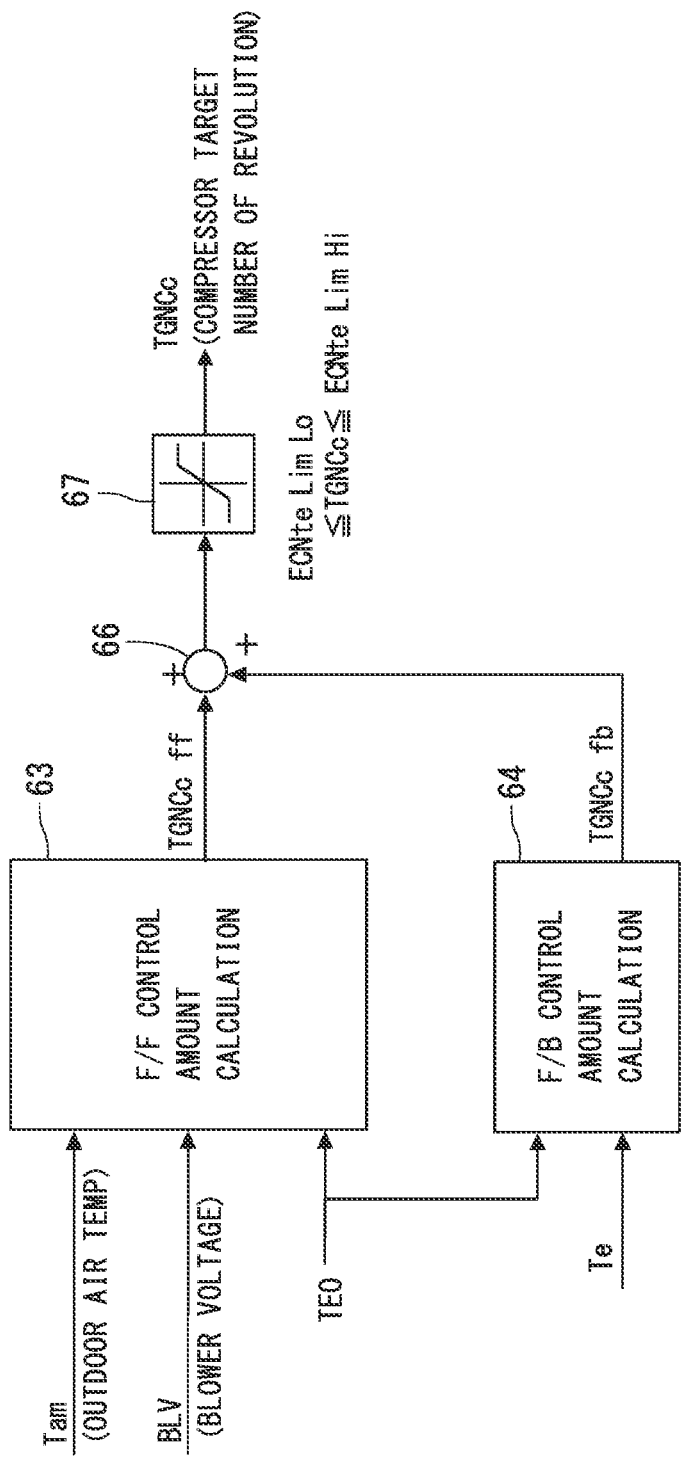
FIG. 4 is another control block diagram concerning the compressor control of the controller of FIG. 2.
Figure 5:
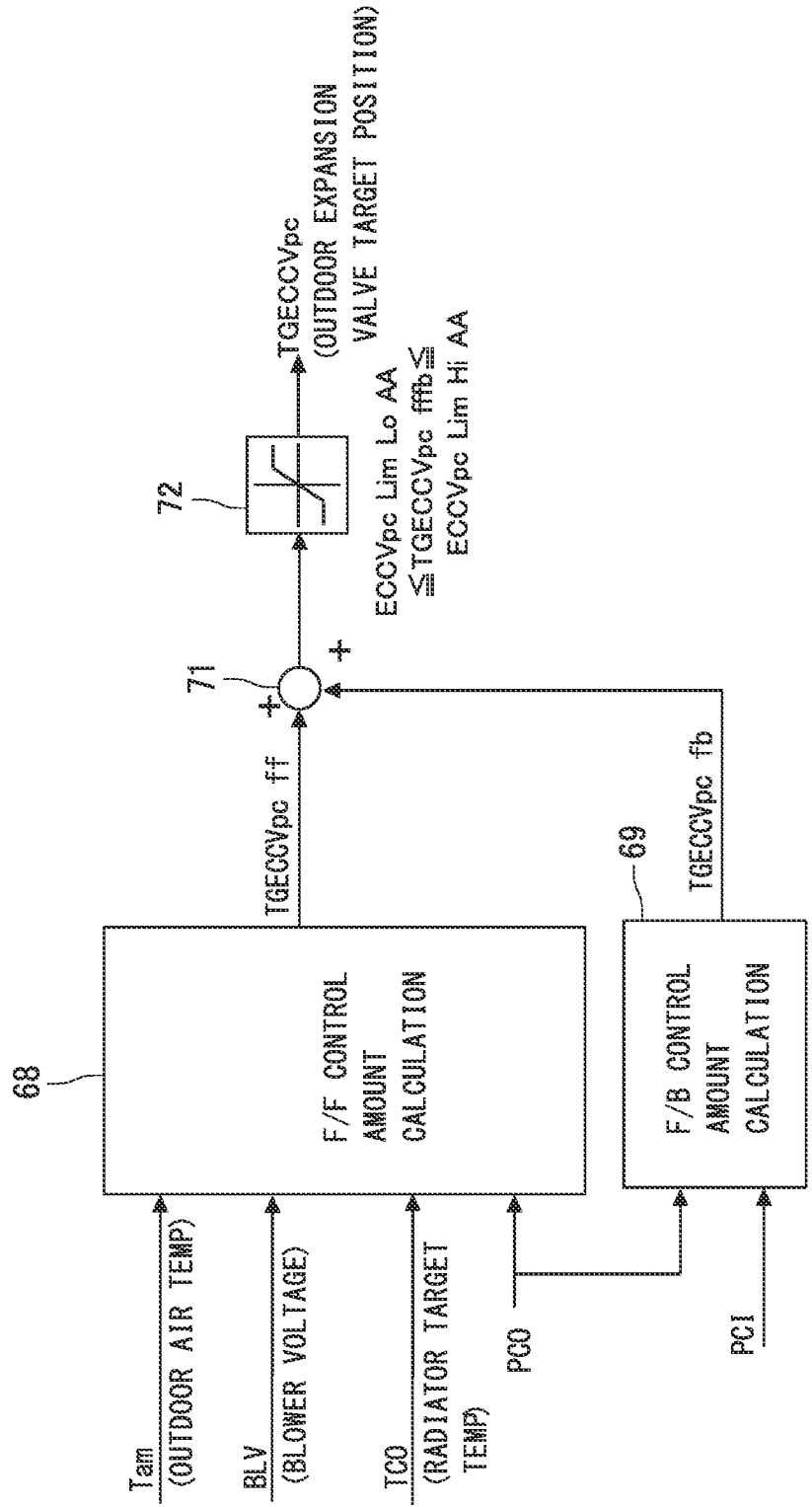
FIG. 5 is a control block diagram concerning outdoor expansion valve control of the controller of FIG. 2.

In this cooling mode, the controller 32 controls the revolution number of the compressor 2 on the basis of the temperature of the heat absorber 9 which is detected by the heat absorber temperature sensor 48. Next, FIG. 3 to FIG. 5 show control block diagrams of the compressor 2 and the outdoor expansion valve 6 by the controller 32 in the abovementioned respective operation modes. FIG. 3 is the control block diagram of the controller 32 which determines a target number of revolution (a compressor target number of revolution) TGNCh of the compressor 2 for the above heating mode and the above dehumidifying and heating mode. An F/F (feedforward) control amount calculation section 58 of the controller 32 calculates an F/F control amount TGNChff of the compressor target number of revolution on the basis of an outdoor air temperature Tam obtained from the outdoor air temperature sensor 33, a blower voltage BLV of the indoor blower 27, an air mix damper opening SW of the air mix damper 28 which is obtained in accordance with SW=(TAO−Te)/(TH−Te), a target subcool degree TGSC which is a target value of a subcool degree SC in the outlet of the radiator 4, a radiator target temperature TCO which is a target value of the temperature of the radiator 4, and a radiator target pressure PCO which is a target value of the pressure of the radiator 4.

It is to be noted that TAO is a target outlet temperature which is a target value of an air temperature from the outlet 29, TH is the temperature of the radiator 4 which is obtained from the radiator temperature sensor 46 (the radiator temperature), and Te is the temperature of the heat absorber 9 which is obtained from the heat absorber temperature sensor 48 (the heat absorber temperature). The air mix damper opening SW varies in a range of 0≤SW≤1, 0 indicates an air mix shut off state where the air is not passed through the radiator 4, and 1 indicates an air mix fully opened state where all the air in the air flow passage 3 is passed through the radiator 4.

The above radiator target pressure PCO is calculated on the basis of the above target subcool degree TGSC and the radiator target temperature TCO by a target value calculation section 59. Furthermore, an F/B (feedback) control amount calculation section 60 calculates an F/B control amount TGNChfb of the compressor target number of revolution on the basis of this radiator target pressure PCO and the radiator pressure PCI which is the refrigerant pressure of the radiator 4. Furthermore, the F/F control amount TGNCnff calculated by the F/F control amount calculation section 58 and the control amount TGNChfb calculated by the F/B control amount calculation section 60 are added by an adder 61, limits of an upper limit of controlling and a lower limit of controlling are attached by a limit setting section 62, and then the compressor target number of revolution TGNCh is determined. In the above heating mode and the dehumidifying and heating mode, the controller 32 controls the revolution number of the compressor 2 on the basis of this compressor target number of revolution TGNCh.

On the other hand, FIG. 4 is the control block diagram of the controller 32 which determines a target number of revolution (a compressor target number of revolution) TGNCc of the compressor 2 for the above cooling mode and the dehumidifying and cooling mode. An F/F control amount calculation section 63 of the controller 32 calculates an F/F control amount TGNCcff of the compressor target number of revolution on the basis of the outdoor air temperature Tam, the blower voltage BLV, and a heat absorber target temperature TEO which is a target value of the temperature of the heat absorber 9.

In addition, an F/B control amount calculation section 64 calculates an F/B control amount TGNCcfb of the compressor target number of revolution on the basis of the heat absorber target temperature TEO and the heat absorber temperature Te. Furthermore, the F/F control amount TGNCcff calculated by the F/F control amount calculation section 63 and the F/B control amount TGNCcfb calculated by the F/B control amount calculation section 64 are added by an adder 66, limits of an upper limit of controlling and a lower limit of controlling are attached by a limit setting section 67, and then the compressor target number of revolution TGNCc is determined. In the cooling mode and the dehumidifying and cooling mode, the controller 32 controls the revolution number of the compressor 2 on the basis of this compressor target number of revolution TGNCc.

It is to be noted that in the above internal cycle mode, the controller 32 controls the revolution number of the compressor 2 by use of a smaller control amount in the compressor target number of revolution TGNCh calculated for the heating mode and the dehumidifying and heating mode and the compressor target number of revolution TGNCc calculated for the cooling mode and the dehumidifying and cooling mode as described above.

Next, FIG. 5 is the control block diagram of the controller 32 which determines a target position (an outdoor expansion valve target position) TGECCVpc of the outdoor expansion valve 6 in the dehumidifying and cooling mode. An F/F control amount calculation section 68 of the controller 32 calculates an F/F control amount TGECCVpcff of the outdoor expansion valve target position on the basis of the outdoor air temperature Tam, the blower voltage BLV, the radiator target temperature TCO, and the radiator target pressure PCO.

In addition, an F/B control amount calculation section 69 calculates an F/B control amount TGECCVpcfb of the outdoor expansion valve target position on the basis of the radiator target pressure PCO and the radiator pressure PCI. Furthermore, the F/F control amount TGECCVpcff calculated by the F/F control amount calculation section 68 and the F/B control amount TGECCVpcfb calculated by the F/B control amount calculation section 69 are added by an adder 71, limits of an upper limit of controlling and a lower limit of controlling are attached by a limit setting section 72, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

The air flowing through the air flow passage 3 is subjected to the cooling from the heat absorber 9 and a heating operation from the radiator 4 (regulated by the air mix damper 28) in the above respective operation modes, to be blown out into the vehicle interior from the outlet 29. The controller 32 calculates the target outlet temperature TAO on the basis of the outdoor air temperature Tam detected by the outdoor air temperature sensor 33, the interior temperature which is detected by the indoor air temperature sensor 37, the above blower voltage, the solar radiation amount detected by the solar radiation sensor 51, and the like, and the target interior temperature (the set temperature) in the vehicle which is set by the operating portion 53, and each operation mode is changed to control the temperature of the air blown out from the outlet 29 into this target outlet temperature TAO as described later.

(6) Changing Control of Operation Mode

Figure 6:
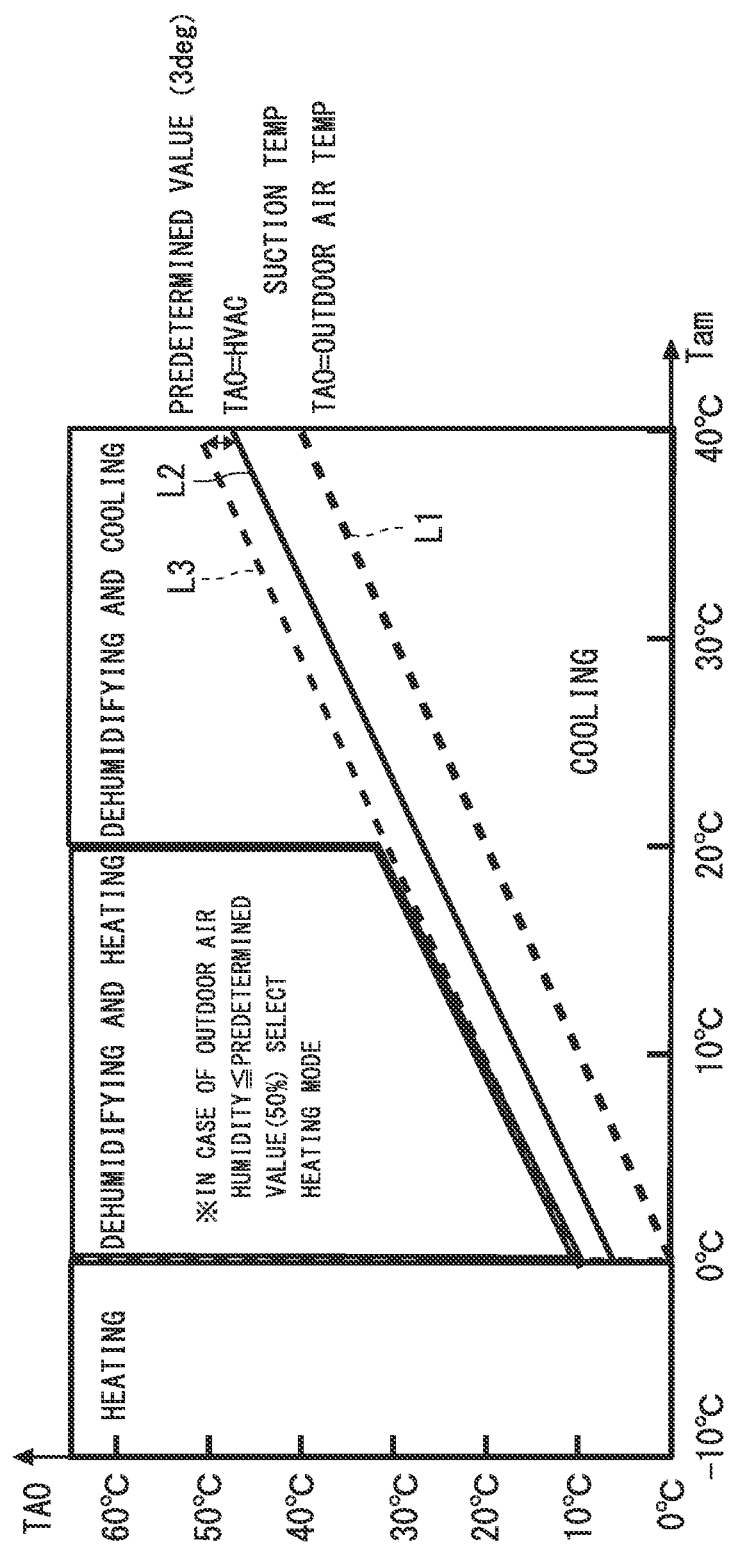
FIG. 6 is a diagram to explain changing control of an operation mode of the controller of FIG. 2.

Next, the changing control of the above respective operation modes by the controller 32 will be described with reference to FIG. 6. The controller 32 selects the operation mode on startup as shown in FIG. 6. That is, in this embodiment, the controller 32 selects the operation mode on the basis of the outdoor air temperature Tam detected by the outdoor air temperature sensor 33 and the target outlet temperature TAO. In FIG. 6, a broken line L1 is a line of the target outlet temperature TAO=the outdoor air temperature Tam, and a solid line L2 is a line of the target outlet temperature TAO=an HVAC suction temperature (a temperature of the air to be sucked from the suction port 25 into the air flow passage 3). In addition, a broken line L3 is a line of a hysteresis set at a predetermined value (three degrees) above the solid line.

When the outdoor air temperature Tam of FIG. 6 is 0° C. or less, the controller 32 selects the heating mode. In addition, when the outdoor air temperature Tam is higher than 0° C. and the target outlet temperature TAO is the HVAC suction temperature or less, the controller selects the cooling mode. Furthermore, when the outdoor air temperature Tam is higher than 0° C. and is a predetermined value (e.g., 20° C. or the like) or less and when the target outlet temperature TAO is higher than the HVAC suction temperature, the controller selects the dehumidifying and heating mode, and further, when the outdoor air temperature Tam is higher than the predetermined value, the controller selects the dehumidifying and cooling mode. It is to be noted that when the outdoor air humidity detected by the outdoor air humidity sensor 34 is a predetermined value (e.g., 50% or the like) or less on such conditions as to select the dehumidifying and heating mode, the controller selects the heating mode.

Furthermore, after the start, the respective operation modes in FIG. 6 are selected and changed in accordance with changes of an environment or setting conditions, e.g., the above outdoor air temperature Tam and the target outlet temperature TAO. In this case, the controller 32 basically shifts from the heating mode to the dehumidifying and heating mode, or from the dehumidifying and heating mode to the heating mode, or from the dehumidifying and heating mode to the dehumidifying and cooling mode, or from the dehumidifying and cooling mode to the dehumidifying and heating mode, and shifts from the dehumidifying and cooling mode to the cooling mode, or from the cooling mode to the dehumidifying and cooling mode. However, when the controller shifts from the dehumidifying and heating mode to the dehumidifying and cooling mode and shifts from the dehumidifying and cooling mode to the dehumidifying and heating mode, the controller shifts via the above internal cycle mode. In addition, the controller shifts from the cooling mode to the internal cycle mode and from the internal cycle to the cooling mode sometimes.

(7-1) Regulating Control of Amount of Refrigerant to be Circulated in Internal Cycle Mode (No. 1)

Figure 19:
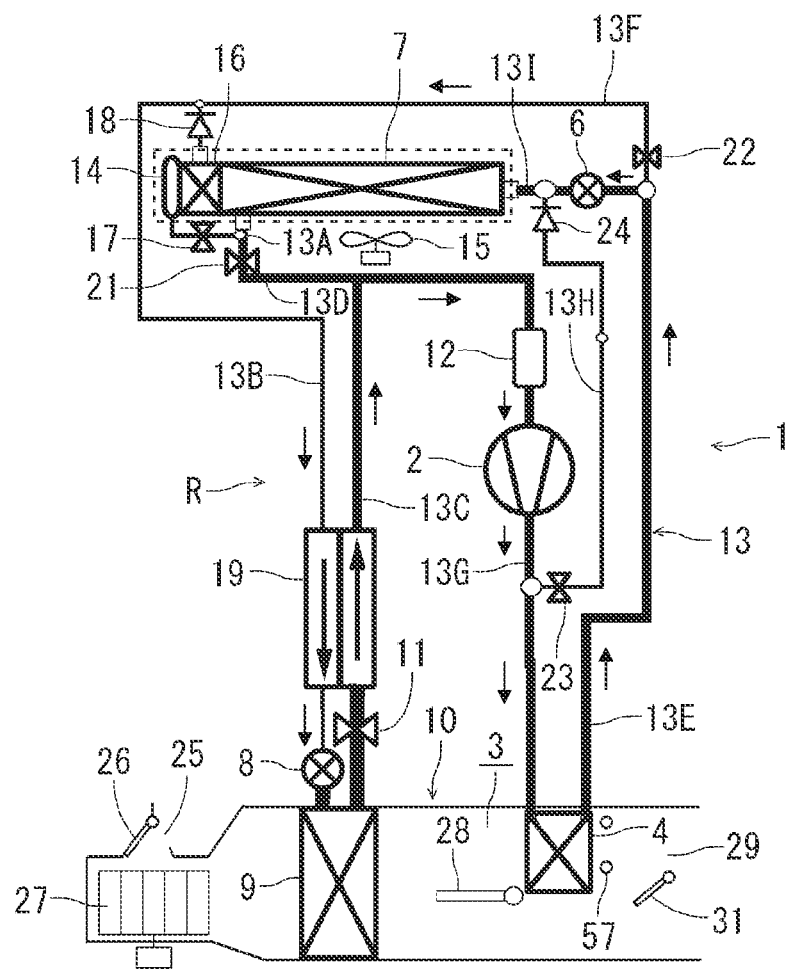
FIG. 19 is a constitutional view of a vehicle air conditioner of one embodiment to which the present invention is applied.
Figure 20:
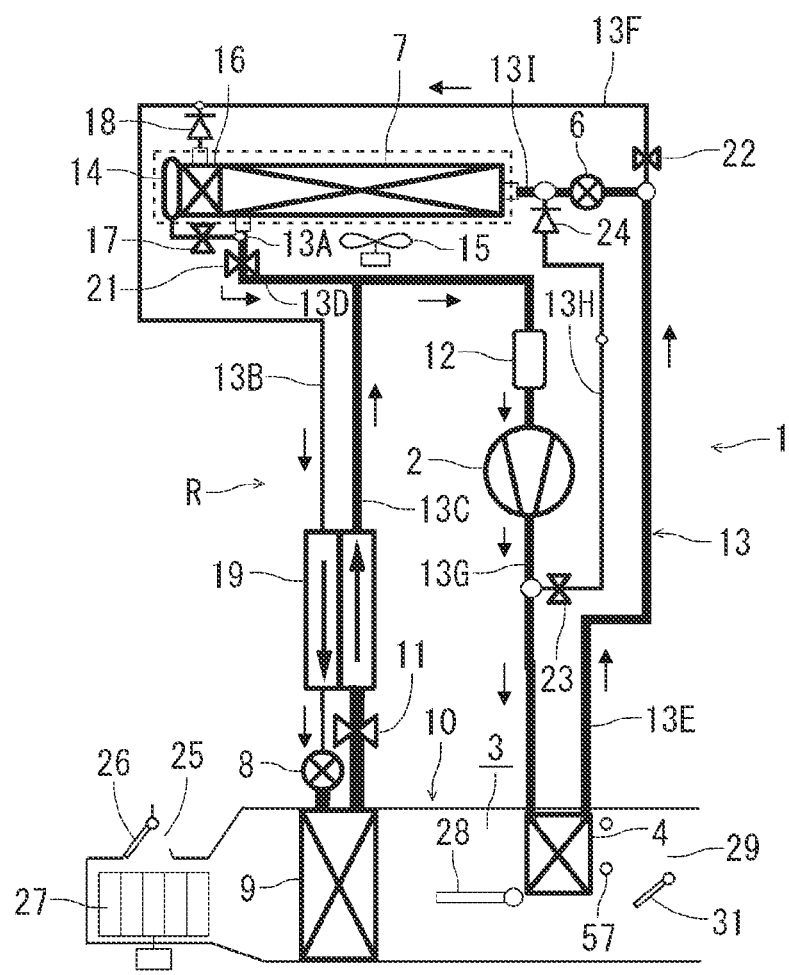
FIG. 20 is a constitutional view of a vehicle air conditioner of one embodiment to which the present invention is applied.

Referring to FIGS. 1, 19, and 20, however, in this internal cycle mode, the outdoor expansion valve 6 is closed at the shut off position, the solenoid valve 21 is also closed, and the inflow of the refrigerant into the outdoor heat exchanger 7 and the outflow of the refrigerant from the outdoor heat exchanger 7 are inhibited, so that in accordance with a state of the refrigerant flowing in the outdoor heat exchanger 7 immediately before the operation mode is changed from the dehumidifying and heating mode to the internal cycle mode or from the dehumidifying and cooling mode to the internal cycle mode, an amount of the refrigerant to be sealed in the outdoor heat exchanger 7 varies. Therefore, excess or lack occurs in the amount of the refrigerant to be circulated in the refrigerant circuit R in the internal cycle mode executed after the operation mode is changed.

It is to be noted that in this application, "the amount of the refrigerant to be circulated" means the amount of the refrigerant to be circulated by the compressor 2 in a region other than the outdoor heat exchanger 7 (in actual, a region from the outdoor expansion valve 6 to the solenoid valve 21).

Figure 7:
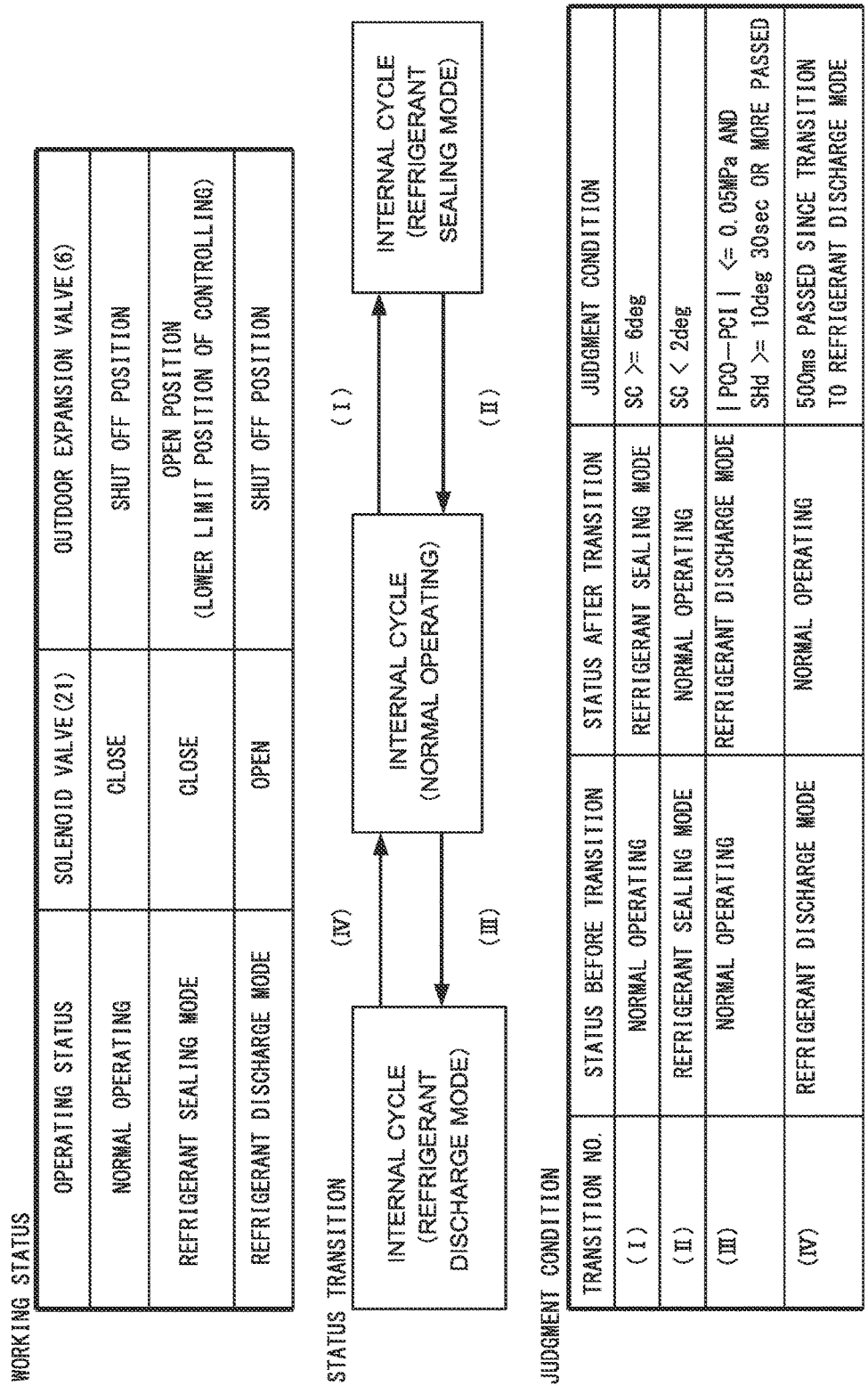
FIG. 7 is a diagram to explain transition of normal operating, a refrigerant sealing mode and a refrigerant discharge mode as one example of regulating control of an amount of a refrigerant to be circulated in an internal cycle mode by the controller of FIG. 2.
Figure 8:
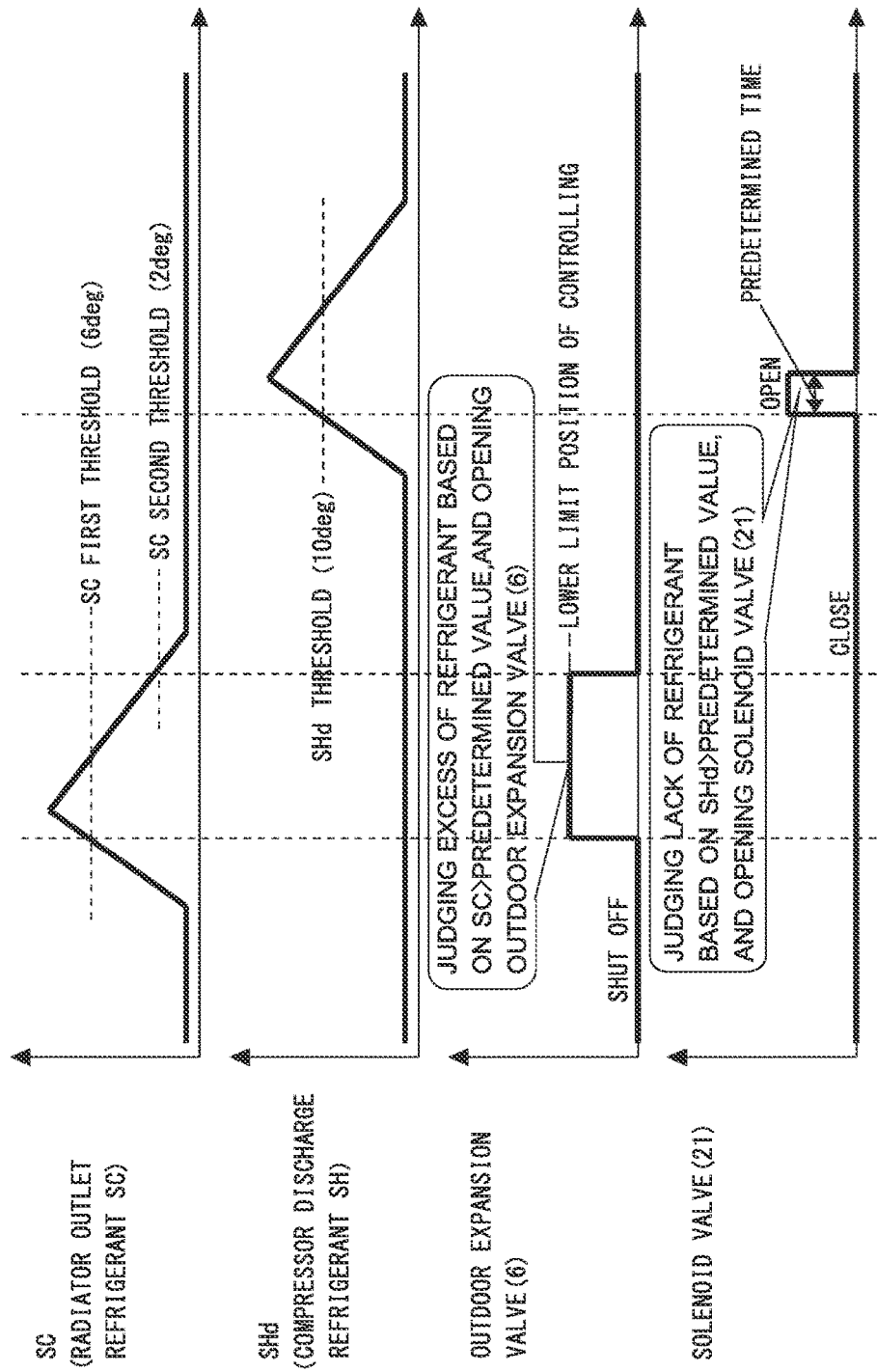
FIG. 8 is a timing chart to explain operations of respective components in FIG. 7.

Therefore, in this embodiment, the controller 32 controls the outdoor expansion valve 6 and the solenoid valve 21 on the basis of a refrigerant subcool degree SC in the outlet of the radiator 4 and a discharged refrigerant superheat degree SHd of the compressor 2, thereby executing a refrigerant sealing mode to seal the refrigerant in the outdoor heat exchanger 7 from the refrigerant circuit R and a refrigerant discharge mode to discharge the refrigerant from the outdoor heat exchanger 7 to the refrigerant circuit R. FIG. 7 is a diagram to explain transition of normal operating, the refrigerant sealing mode and the refrigerant discharge mode in such an internal cycle mode, and FIG. 8 is a timing chart to explain operations of respective components in this case. It is to be noted that during normal operating in the internal cycle mode, the controller 32 closes the outdoor expansion valve 6 to the shut off position and closes the solenoid valve 21 as described above.

Here, the refrigerant subcool degree SC of the radiator 4 can be obtained from the radiator temperature TH detected by the radiator temperature sensor 46 and the radiator pressure PCI detected by the radiator pressure sensor 47. In addition, the discharged refrigerant superheat degree SHd of the compressor 2 can be obtained from the discharged refrigerant temperature of the compressor 2 which is detected by the discharge temperature sensor 42 and the discharged refrigerant pressure of the compressor 2 which is detected by the discharge pressure sensor 43. Furthermore, when the amount of the refrigerant to be circulated in this internal cycle mode is excessively large, the high pressure of the refrigerant circuit R rises, and an amount of the refrigerant to be condensed in the radiator 4 increases, so that the refrigerant subcool degree SC in the radiator 4 also enlarges. Conversely, when the amount of the refrigerant to be circulated is insufficient (is excessively small), an amount of the refrigerant to be sucked into the compressor 2 decreases, so that the discharged refrigerant superheat degree SHd of the compressor 2 enlarges.

Therefore, in the internal cycle mode, when a working status is normal operating and the refrigerant subcool degree SC of the radiator 4 enlarges to be an SC first threshold (e.g., six degrees) or more, the controller 32 judges that the amount of the refrigerant to be circulated is excessively large, and shifts to the refrigerant sealing mode ((I) of FIG. 7). In this refrigerant sealing mode, the controller 32 opens the outdoor expansion valve 6 at a minimum position of controlling (an open position at a lower limit of controlling) in a state where the solenoid valve 21 is closed. In consequence, a part of the refrigerant flowing out from the radiator 4 through the refrigerant pipe 13E is distributed from the refrigerant flowing toward a solenoid valve 22 direction, and flows into the outdoor heat exchanger 7 through the outdoor expansion valve 6.

In consequence, the amount of the refrigerant to be circulated in the refrigerant circuit R decreases, and hence the refrigerant subcool degree SC of the radiator 4 also becomes smaller. Furthermore, when this refrigerant subcool degree SC lowers to be smaller than an SC second threshold (e.g., two degrees), the controller 32 judges that the amount of the refrigerant to be circulated lowers down to a suitable amount, to return the outdoor expansion valve 6 to the shut off position, and returns to the normal operating ((II) of FIG. 7). In consequence, the amount of the refrigerant sealed in the outdoor heat exchanger 7 enlarges, and the amount of the refrigerant to be circulated which has been excessively large is regulated into a suitable amount.

On the other hand, during this normal operating, a predetermined time (e.g., 30 seconds) has passed in a state where an absolute value of a difference of the radiator target pressure PCO−the radiator pressure PCI is smaller than a predetermined value (e.g., 0.05 MPa), i.e., a state where an operating status of the compressor 2 is stable and in a state where the discharged refrigerant superheat degree SHd of the compressor 2 enlarges to become an SHd threshold (e.g., ten degrees) or more. In this case, the controller 32 judges that the amount of the refrigerant to be circulated is insufficient (is excessively small), and shifts to the refrigerant discharge mode ((III) of FIG. 7). In this refrigerant discharge mode, the controller 32 opens the solenoid valve 21 only for a predetermined time (e.g., 500 ms) in a state where the outdoor expansion valve 6 is closed at the shut off position. In consequence, the refrigerant enclosed in the outdoor heat exchanger 7 flows out to the refrigerant pipe 13D, and joins the refrigerant flowing through the refrigerant pipe 13C to be sucked from the accumulator 12 into the compressor 2.

In consequence, the amount of the refrigerant to be circulated in the refrigerant circuit R increases, and hence the discharged refrigerant superheat degree SHd of the compressor 2 also becomes smaller. It is to be noted that the solenoid valve 21 is opened for the above predetermined time and then closed, so that this refrigerant discharge mode ends in the abovementioned predetermined time and returns to the normal operating ((IV) of FIG. 7). However, when the amount of the refrigerant to be circulated is not returned to a suitable amount even by executing the refrigerant discharge mode once and the discharged refrigerant superheat degree SHd of the compressor 2 matches the abovementioned judgment condition again, the controller 32 executes the refrigerant discharge mode again ((III) of FIG. 7). In consequence, the refrigerant enclosed in the outdoor heat exchanger 7 is discharged into the refrigerant circuit R and the lacking (excessively small) amount of the refrigerant to be circulated is regulated into the suitable amount.

(7-2) Regulating Control of Amount of Refrigerant to be Circulated in Internal Cycle Mode (No. 2)

Figure 9:
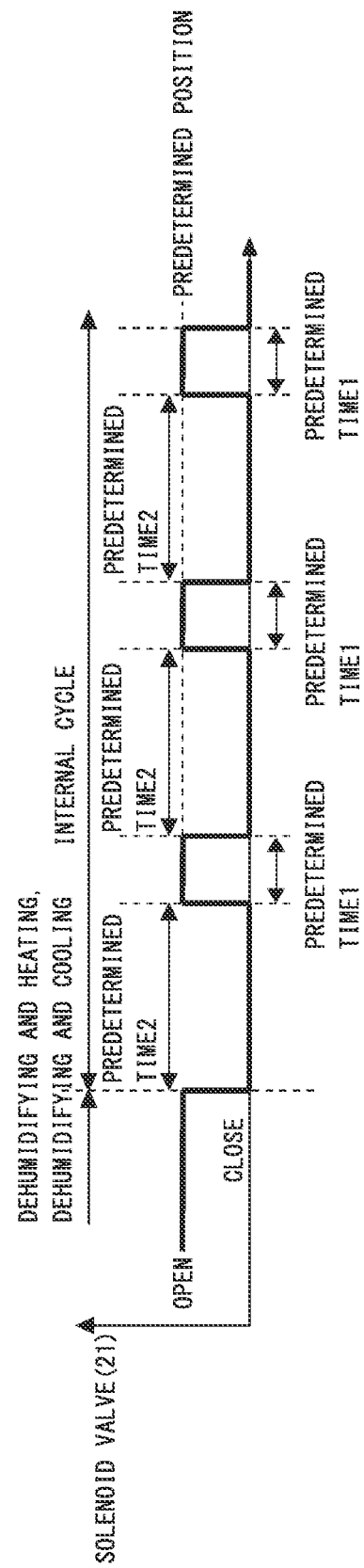
FIG. 9 is a diagram to explain another example of the regulating control of the amount of the refrigerant to be circulated in the internal cycle mode by the controller of FIG. 2.

Next, a timing chart of FIG. 9 shows another example of the regulating control of the amount of the refrigerant to be circulated in the internal cycle mode by the controller 32. Even when the outdoor expansion valve 6 constituted of an electric valve is closed at the shut off position, refrigerant leakage slightly occurs. Therefore, even when the internal cycle mode is executed in a state where the amount of the refrigerant to be circulated is suitable (the abovementioned normal operating status) and the outdoor expansion valve 6 is controlled at the shut off position, the refrigerant is sealed in the outdoor heat exchanger 7, and eventually there is the risk that the amount of the refrigerant to be circulated falls into a lacking (excessively small) state.

Therefore, in this embodiment, the controller 32 periodically opens the solenoid valve 21 for a predetermined time (a predetermined time 1 of FIG. 9) every predetermined timing (a predetermined time 2 of FIG. 9) in the internal cycle mode, and discharges the refrigerant from the outdoor heat exchanger 7 to the refrigerant circuit R. In consequence, it is possible to eliminate the lack of the amount of the refrigerant to be circulated due to the inflow of the refrigerant into the outdoor heat exchanger 7 which occurs due to the leakage of the outdoor expansion valve 6 when the outdoor expansion valve 6 is closed to inhibit the inflow of the refrigerant into the outdoor heat exchanger 7, and a required air conditioning performance can be acquired.

It is to be noted that the above predetermined time 1 (an amount of the refrigerant to be discharged) or the predetermined time 2 (a timing to discharge the refrigerant) may be regulated on the basis of a physical amount correlated with a refrigerant flow rate in the refrigerant circuit R, e.g., the revolution number of the compressor 2 (TGNCh or TGNCc mentioned above). For example, when the refrigerant flow rate is large (the revolution number of the compressor 2 is high), the predetermined time 1 is lengthened and/or the predetermined time 2 is shortened to increase the amount of the refrigerant to be discharged, and conversely, when the refrigerant flow rate is small (the revolution number of the compressor 2 is low), the predetermined time 1 is shortened and/or the predetermined time 2 is lengthened to decrease the amount of the refrigerant to be discharged.

When the timing to discharge the refrigerant from the outdoor heat exchanger 7 and/or the discharge amount is regulated on the basis of the refrigerant flow rate in the refrigerant circuit R in this manner, it is possible to more accurately control the amount of the refrigerant to be discharged from the outdoor heat exchanger 7 and to precisely regulate the amount of the refrigerant to be circulated.

(7-3) Regulating Control of Amount of Refrigerant to be Circulated in Internal Cycle Mode (No. 3)

Figure 10:
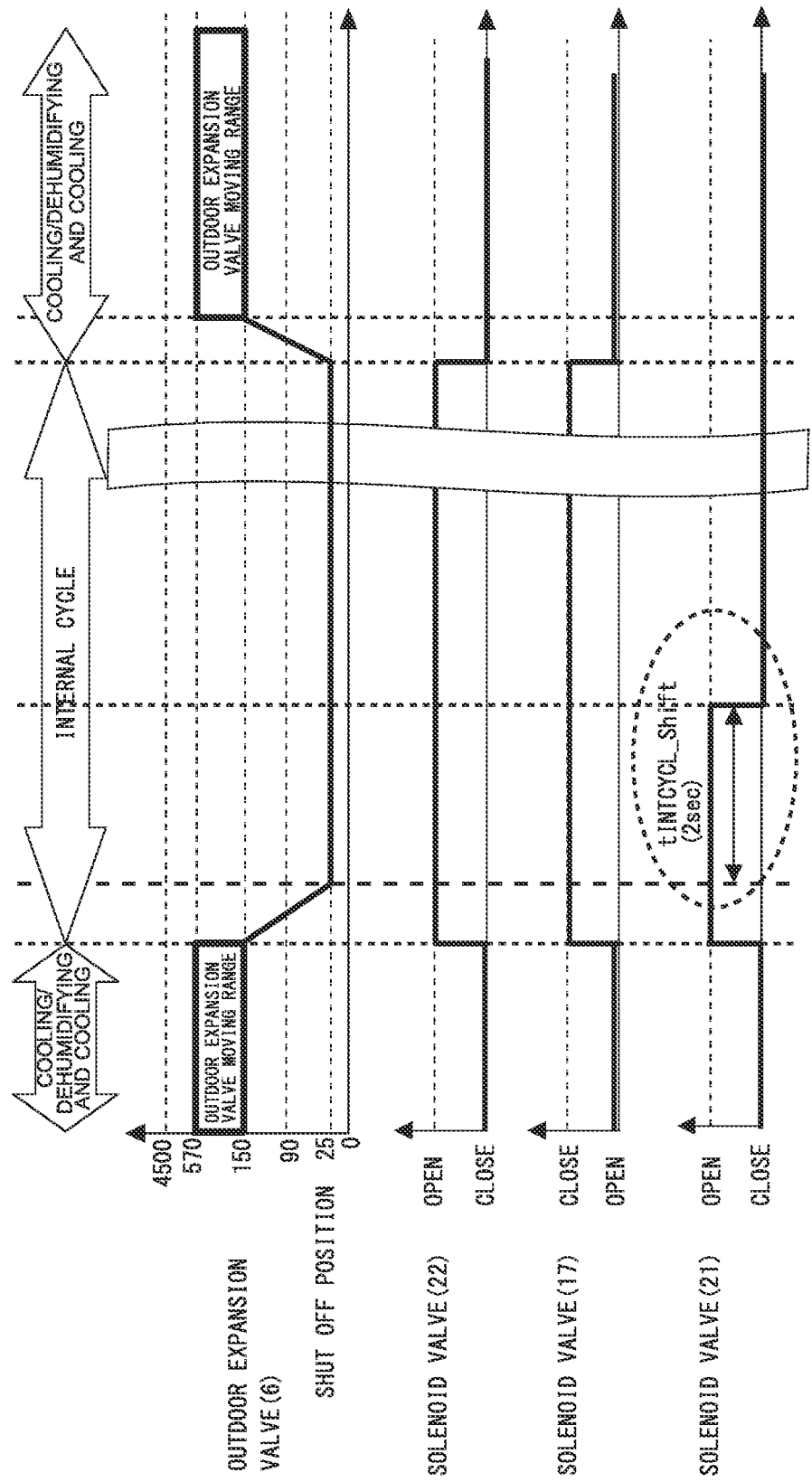
FIG. 10 is a diagram to explain still another example of the regulating control of the amount of the refrigerant to be circulated in the internal cycle mode by the controller of FIG. 2.
Figure 11:
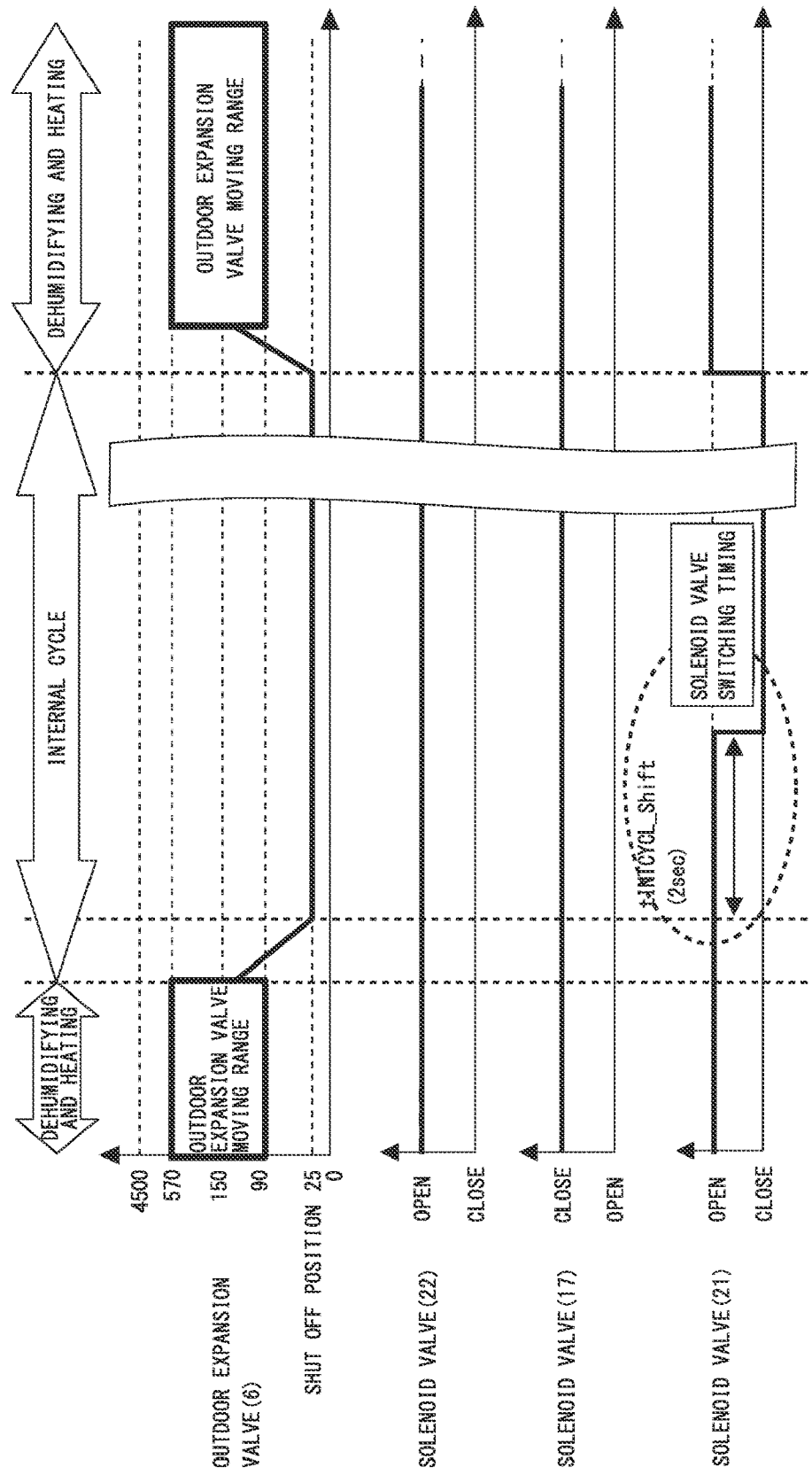
FIG. 11 is similarly a diagram to explain a further example of the regulating control of the amount of the refrigerant to be circulated in the internal cycle mode by the controller of FIG. 2.

Next, timing charts of FIG. 10 and FIG. 11 show further examples of the regulating control of the amount of the refrigerant to be circulated in the internal cycle mode by the controller 32. In the above examples of FIG. 7 and FIG. 8, the sealing of the refrigerant into the outdoor heat exchanger 7 and the discharge of the refrigerant from the outdoor heat exchanger 7 are controlled on the basis of the refrigerant subcool degree of the radiator 4 and the discharged refrigerant superheat degree of the compressor 2, but when the lack of the refrigerant may only be avoided, a timing to close the solenoid valve 21 may be delayed as shown in FIG. 10 and FIG. 11.

In FIG. 10, when the controller 21 closes the outdoor expansion valve 6 at the shut off position from the cooling or dehumidifying and cooling mode, opens the solenoid valve 22 and closes the solenoid valve 17 to shift to the internal cycle mode, the controller opens the solenoid valve 21 which has been closed for a predetermined time (two seconds in the embodiment) after the outdoor expansion valve 6 is closed at the shut off position. Additionally, in FIG. 11, when the controller 21 closes the outdoor expansion valve 6 at the shut off position from the dehumidifying and heating mode and closes the solenoid valve 21 to shift to the internal cycle mode, the controller closes the solenoid valve 21 with a delay of a predetermined time (two seconds in the embodiment) after the outdoor expansion valve 6 is closed at the shut off position.

In consequence, when the controller shifts from the cooling or dehumidifying and cooling mode or the dehumidifying and heating mode to the internal cycle mode, a timing to inhibit the outflow of the refrigerant from the outdoor heat exchanger 7 is delayed, and hence it is possible to beforehand avoid the lack of the amount of the refrigerant to be circulated which occurs after shifting to the internal cycle mode and to acquire the required air conditioning performance.

(7-4) Regulating Control of Amount of Refrigerant to be Circulated in Internal Cycle Mode (No. 4)

Figure 12:
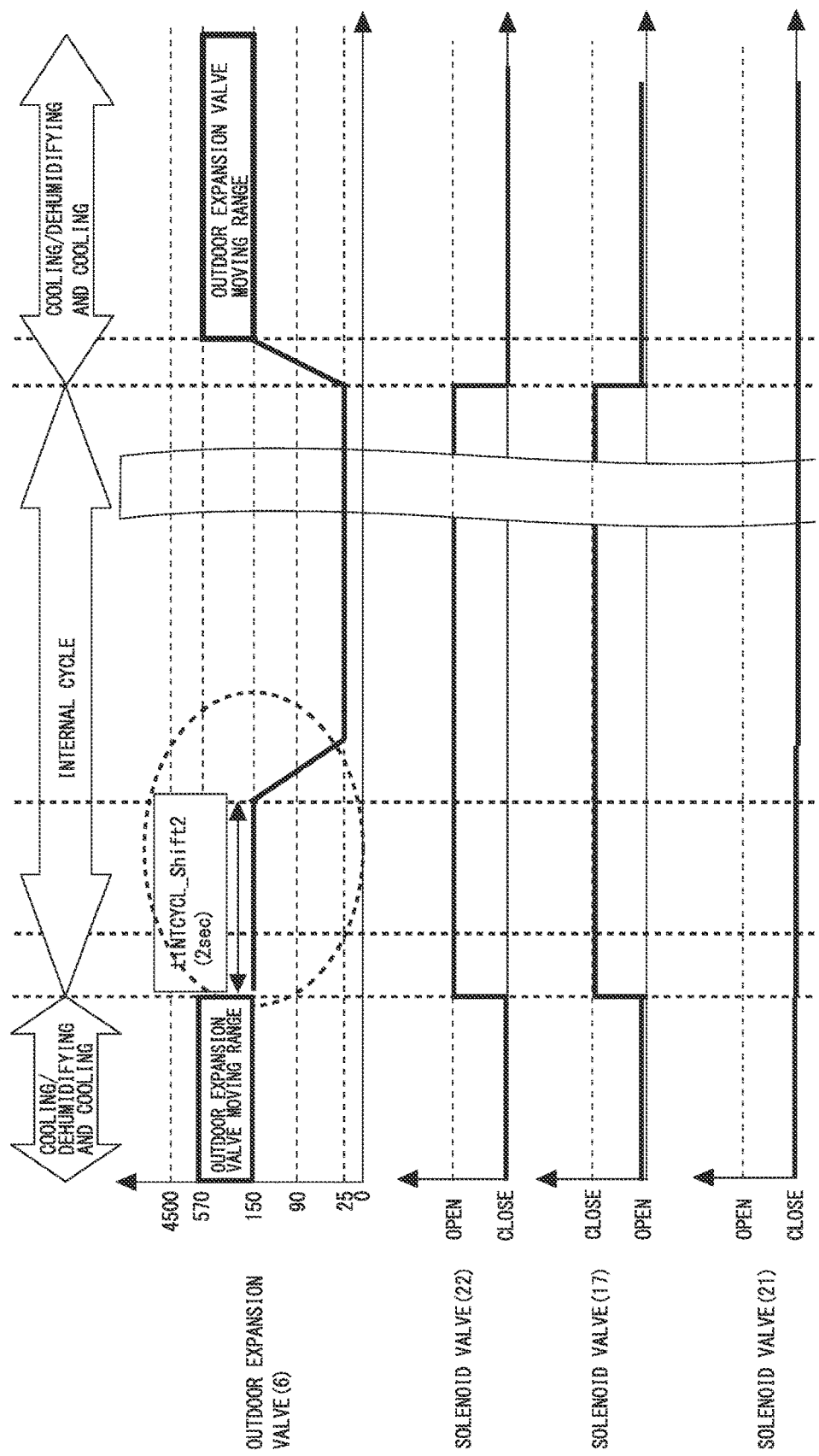
FIG. 12 is a diagram to explain a further example of the regulating control of the amount of the refrigerant to be circulated in the internal cycle mode by the controller of FIG. 2.
Figure 13:
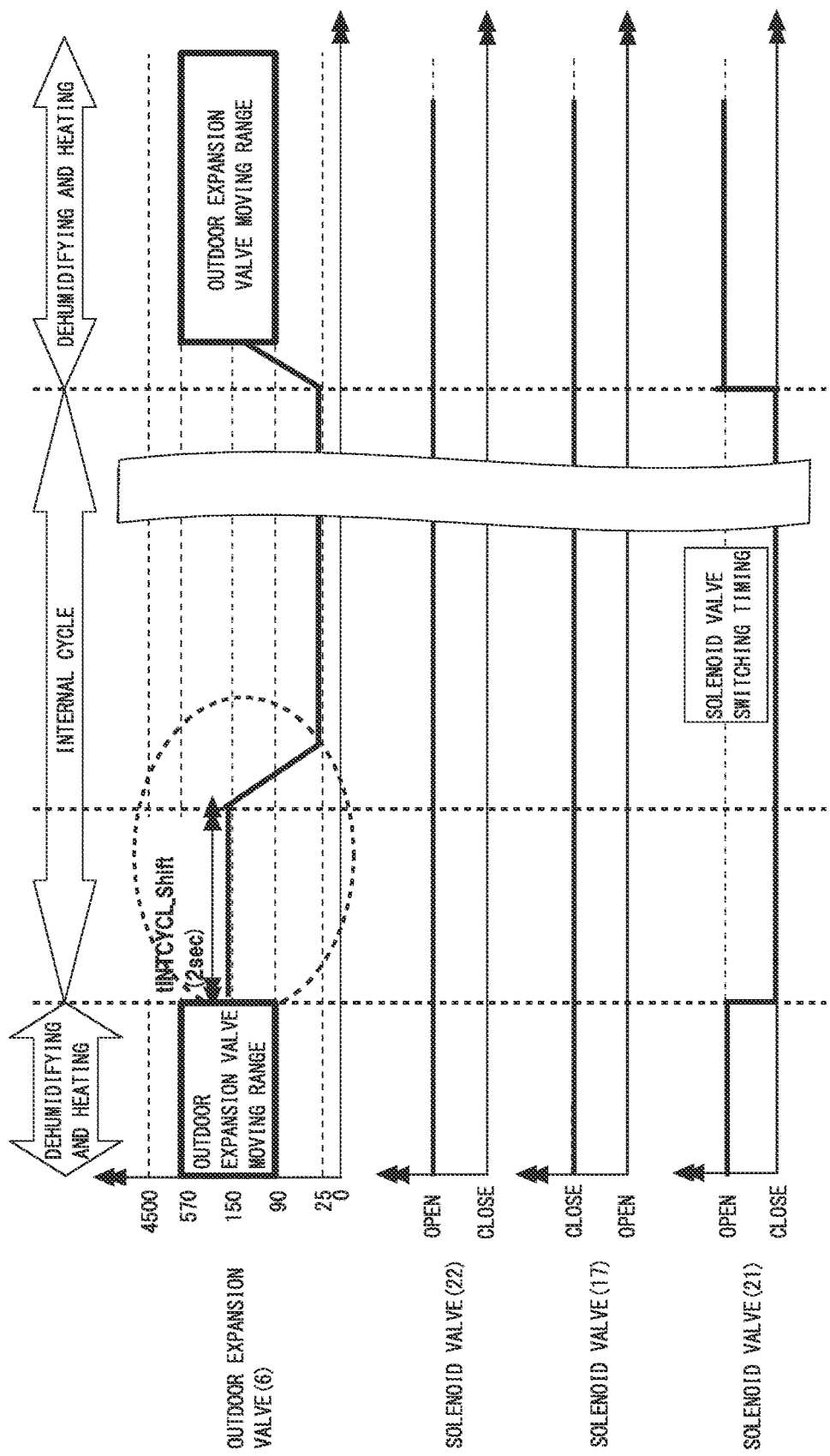
FIG. 13 is similarly a diagram to explain a still further example of the regulating control of the amount of the refrigerant to be circulated in the internal cycle mode by the controller of FIG. 2.

Next, timing charts of FIG. 12 and FIG. 13 show still further examples of the regulating control of the amount of the refrigerant to be circulated in the internal cycle mode by the controller 32. Conversely to the above embodiment, when the excessive refrigerant may only be avoided, a timing to close the outdoor expansion valve 6 at the shut off position may be delayed as shown in FIG. 12 and FIG. 13.

In FIG. 12, when the controller 21 closes the outdoor expansion valve 6 at the shut off position from the cooling or dehumidifying and cooling mode, opens the solenoid valve 22 and closes the solenoid valve 17 to shift to the internal cycle mode, the controller closes the outdoor expansion valve 6 at the shut off position with a delay of a predetermined time (two seconds in the embodiment) after the solenoid valves 22 and 17 are switched. Additionally, in FIG. 13, when the controller 21 closes the outdoor expansion valve 6 at the shut off position from the dehumidifying and heating mode and closes the solenoid valve 21 to shift to the internal cycle mode, the controller closes the outdoor expansion valve 6 at the shut off position with a delay of a predetermined time (two seconds in the embodiment) after the solenoid valve 21 is closed.

In consequence, during the shift from the cooling or dehumidifying and cooling mode or the dehumidifying and heating mode to the internal cycle mode, the timing to inhibit the inflow of the refrigerant into the outdoor heat exchanger 7 is delayed, so that it is possible to beforehand avoid the excessively large amount of the refrigerant to be circulated which is generated after the mode is shifted to the internal cycle mode and to eliminate occurrence of a high pressure abnormality.

It is to be noted that the constitution of the refrigerant circuit R and the respective numeric values described in the above embodiment are not limited, and are, needless to say, changeable without departing from the gist of the present invention.

DESCRIPTION OF REFERENCE NUMERALS

1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 21, 22 and 23 solenoid valve
26 suction changing damper
27 indoor blower (a blower fan)
28 air mix damper
32 controller (control means)
57 electric heater
R refrigerant circuit

The invention claimed is:

1. A vehicle air conditioner comprising:
a compressor which compresses a refrigerant;
an air flow passage through which air to be supplied into a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant radiate or absorb heat;
an expansion valve which decompresses the refrigerant flowing into the outdoor heat exchanger;
and control means,
wherein the vehicle air conditioner includes an internal cycle mode in which inflow of the refrigerant into the outdoor heat exchanger and outflow of the refrigerant from the outdoor heat exchanger are inhibited, the refrigerant discharged from the compressor radiates heat in the radiator, and the refrigerant by which heat has been radiated is decompressed and then absorbs heat in the heat absorber;
wherein, in the internal cycle mode, the control means is configured to judge when an amount of the refrigerant to be circulated is excessively large and in response execute a refrigerant sealing mode to seal the refrigerant in the outdoor heat exchanger in a case where a refrigerant subcool degree of the radiator enlarges to be a predetermined threshold or more, and the control means is configured to judge when the amount of the refrigerant to be circulated is insufficient and in response execute a refrigerant discharge mode to discharge the refrigerant from the outdoor heat exchanger in a case where an operating status of the compressor is stable and a discharged refrigerant superheat degree of the compressor enlarges to become another threshold or more;
the control means being configured to allow for selective execution among the internal cycle mode and one of:
a heating mode in which the refrigerant discharged from the compressor radiates heat in the radiator, and the refrigerant by which heat has been radiated is decompressed and then absorbs heat in the outdoor heat exchanger;
a dehumidifying and heating mode in which the refrigerant discharged from the compressor radiates heat in the radiator, and the refrigerant by which heat has been radiated is decompressed and then absorbs heat in the heat absorber and the outdoor heat exchanger;

a dehumidifying and cooling mode in which the refrigerant discharged from the compressor radiates heat in the radiator and the outdoor heat exchanger, and the refrigerant by which heat has been radiated is decompressed and then absorbs heat in the heat absorber; and a cooling mode in which the refrigerant discharged from the compressor radiates heat in the outdoor heat exchanger, and the refrigerant by which heat has been radiated is decompressed and then absorbs heat in the heat absorber.

2. The vehicle air conditioner according to claim 1, wherein the vehicle air condition includes at least one additional mode of operation selected among the heating mode, the dehumidifying and heating mode, the dehumidifying and cooling mode and the cooling mode.

3. The vehicle air conditioner according to claim 2,
wherein the control means judges whether or not the amount of the refrigerant to be circulated is excessively large on the basis of the refrigerant subcool degree of the radiator, and judges whether or not the amount of the refrigerant to be circulated is insufficient on the basis of the discharged refrigerant superheat degree of the compressor.

4. The vehicle air conditioner according to claim 1,
wherein the vehicle air condition includes a plurality of additional modes of operation selected among the heating mode, the dehumidifying and heating mode, the dehumidifying and cooling mode and the cooling mode; and
wherein the control means is configured to allow for the selection and execution among the internal cycle mode and the plurality of additional modes of operation.

5. The vehicle air conditioner according to claim 4,
wherein the control means judges whether or not the amount of the refrigerant to be circulated is excessively large on the basis of the refrigerant subcool degree of the radiator, and judges whether or not the amount of the refrigerant to be circulated is insufficient on the basis of the discharged refrigerant superheat degree of the compressor.

6. The vehicle air conditioner according to claim 1,
wherein the vehicle air condition includes a plurality of additional modes of operation including each of the heating mode, the dehumidifying and heating mode, the dehumidifying and cooling mode and the cooling mode; and
wherein the control means is configured to allow for the selection and execution among the internal cycle mode and the plurality of additional modes of operation.

7. The vehicle air conditioner according to claim 6,
wherein the control means judges whether or not the amount of the refrigerant to be circulated is excessively large on the basis of the refrigerant subcool degree of the radiator, and judges whether or not the amount of the refrigerant to be circulated is insufficient on the basis of the discharged refrigerant superheat degree of the compressor.

8. The vehicle air conditioner according to claim 1, wherein the vehicle air conditioner includes the dehumidifying and heating mode.

9. The vehicle air conditioner according to claim 1, wherein the vehicle air conditioner includes the dehumidifying and cooling mode.

10. The vehicle air conditioner according to claim 1, wherein the control means allows for selective execution among each of the heating mode, the dehumidifying and heating mode, the dehumidifying and cooling mode and the cooling mode.

* * * * *